United States Patent
Murray et al.

(10) Patent No.: US 9,600,518 B2
(45) Date of Patent: Mar. 21, 2017

(54) METHODS AND SYSTEMS FOR PRESENTING ONLINE CONTENT ELEMENTS BASED ON INFORMATION CAUSED TO BE STORED ON A COMMUNICATION APPARATUS BY A SERVICE PROVIDER

(75) Inventors: Sean MacLean Murray, Toronto (CA); Stéphane Maxime François Fortier, Breakeyville (CA); Jean Bouchard, Sillery (CA)

(73) Assignee: BCE INC., Montreal, Quebec (CA)

( * ) Notice: Subject to any disclaimer, the term of this patent is extended or adjusted under 35 U.S.C. 154(b) by 1729 days.

(21) Appl. No.: 12/224,506

(22) PCT Filed: Nov. 22, 2007

(86) PCT No.: PCT/CA2007/002119
§ 371 (c)(1),
(2), (4) Date: Aug. 28, 2008

(87) PCT Pub. No.: WO2008/148185
PCT Pub. Date: Dec. 11, 2008

(65) Prior Publication Data
US 2011/0246601 A1    Oct. 6, 2011

Related U.S. Application Data

(60) Provisional application No. 60/941,830, filed on Jun. 4, 2007.

(51) Int. Cl.
*G06F 15/16* (2006.01)
*G06F 17/30* (2006.01)
(Continued)

(52) U.S. Cl.
CPC ....... *G06F 17/30386* (2013.01); *G06Q 20/02* (2013.01); *G06Q 20/10* (2013.01);
(Continued)

(58) Field of Classification Search
USPC .......... 709/203, 219, 224, 218, 245; 705/14; 707/500; 717/104
See application file for complete search history.

(56) References Cited

U.S. PATENT DOCUMENTS

| | | | |
|---|---|---|---|
| 5,903,721 | A | 5/1999 | Sixtus |
| 5,903,878 | A | 5/1999 | Talati et al. |

(Continued)

FOREIGN PATENT DOCUMENTS

| | | |
|---|---|---|
| CA | 2 315 308 A1 | 9/2001 |
| CA | 2 413 340 A1 | 5/2004 |

(Continued)

OTHER PUBLICATIONS

Non-Final Office Action issued by the United States Patent and Trademark Office on May 26, 2011 in connection with U.S. Appl. No. 12/227,709, 21 pages.

(Continued)

*Primary Examiner* — Quang N Nguyen
(74) *Attorney, Agent, or Firm* — Gowling WLG (Canada) LLP

(57) ABSTRACT

Methods and systems for presenting online content elements based on information caused to be stored on a communication apparatus by a service provider. One of the methods is a method for presenting online content at a communication apparatus. The method comprises: obtaining information caused to be stored on the communication apparatus by a service provider providing network access to the communication apparatus, the information pertaining to a profile maintained by the service provider; determining an online content element to be presented at the communication apparatus based on the information; and causing the communication apparatus to present the online content element. The online content element may be an advertising content element forming an online advertisement, a primary content (Continued)

element of a network site, or an online page. The information may include location information, personal information, and/or bandwidth information. Servers for implementing the methods are also provided.

62 Claims, 6 Drawing Sheets

(51) Int. Cl.
| | |
|---|---|
| G06Q 20/02 | (2012.01) |
| G06Q 20/10 | (2012.01) |
| G06Q 20/40 | (2012.01) |
| G06Q 30/02 | (2012.01) |
| G06Q 40/00 | (2012.01) |
| H04L 29/08 | (2006.01) |
| H04L 29/06 | (2006.01) |
| H04W 4/02 | (2009.01) |

(52) U.S. Cl.
CPC ......... *G06Q 20/40* (2013.01); *G06Q 30/0254* (2013.01); *G06Q 30/0264* (2013.01); *G06Q 40/00* (2013.01); *G06Q 40/12* (2013.12); *H04L 63/0892* (2013.01); *H04L 67/10* (2013.01); *H04W 4/023* (2013.01)

(56) References Cited

U.S. PATENT DOCUMENTS

| | | | |
|---|---|---|---|
| 6,029,150 A | 2/2000 | Kravitz | |
| 6,041,353 A | 3/2000 | Hirata et al. | |
| 6,169,890 B1 | 1/2001 | Vatanen | |
| 6,339,761 B1 | 1/2002 | Cottingham | |
| 6,484,148 B1 | 11/2002 | Boyd | |
| 6,487,538 B1 | 11/2002 | Gupta et al. | |
| 6,700,965 B1 | 3/2004 | Ferrer et al. | |
| 6,836,765 B1 | 12/2004 | Sussman | |
| 6,859,791 B1 | 2/2005 | Spagna et al. | |
| 6,895,387 B1* | 5/2005 | Roberts et al. | 705/14.47 |
| 6,957,393 B2 | 10/2005 | Fano et al. | |
| 7,111,789 B2 | 9/2006 | Rajasekaran et al. | |
| 7,292,996 B2 | 11/2007 | Nobrega et al. | |
| 7,359,869 B1 | 4/2008 | Ananda | |
| 7,411,905 B1 | 8/2008 | Cook et al. | |
| 7,630,939 B1 | 12/2009 | Kolls | |
| 7,665,658 B2 | 2/2010 | Fields | |
| 7,778,935 B2 | 8/2010 | Colella | |
| 7,818,229 B2 | 10/2010 | Imrey et al. | |
| 7,827,101 B2 | 11/2010 | Mascavage | |
| 7,827,108 B2 | 11/2010 | Perlman et al. | |
| 7,941,370 B2 | 5/2011 | Paulsen | |
| 7,983,961 B1* | 7/2011 | Chang et al. | 705/26.7 |
| 8,032,536 B2 | 10/2011 | Wu | |
| 8,041,717 B2 | 10/2011 | Ramer et al. | |
| 8,045,956 B2 | 10/2011 | Sun et al. | |
| 8,321,278 B2 | 11/2012 | Haveliwala et al. | |
| 8,510,189 B2 | 8/2013 | Imrey et al. | |
| 8,566,237 B2 | 10/2013 | Forzley | |
| 2001/0053999 A1* | 12/2001 | Feinberg | 705/14 |
| 2002/0010747 A1 | 1/2002 | Jaehyuk-Hwang | |
| 2002/0019831 A1* | 2/2002 | Wade | 707/500 |
| 2002/0035622 A1 | 3/2002 | Barber | |
| 2002/0069176 A1 | 6/2002 | Newman | |
| 2002/0077837 A1 | 6/2002 | Krueger et al. | |
| 2002/0107981 A1* | 8/2002 | Moore et al. | 709/245 |
| 2002/0143655 A1 | 10/2002 | Elston et al. | |
| 2002/0161701 A1 | 10/2002 | Warmack | |
| 2003/0023489 A1 | 1/2003 | McGuire et al. | |
| 2003/0041240 A1 | 2/2003 | Roskind et al. | |
| 2003/0105710 A1 | 6/2003 | Barbara et al. | |
| 2003/0140120 A1* | 7/2003 | Hartman | 709/219 |
| 2003/0172036 A1 | 9/2003 | Feigenbaum | |
| 2003/0187949 A1* | 10/2003 | Bhatt et al. | 709/218 |
| 2004/0006489 A1 | 1/2004 | Bynon | |
| 2004/0102197 A1* | 5/2004 | Dietz | 455/456.1 |
| 2004/0205004 A1 | 10/2004 | Bahl et al. | |
| 2004/0250236 A1* | 12/2004 | O'Malley et al. | 717/104 |
| 2005/0021853 A1 | 1/2005 | Parekh et al. | |
| 2005/0066339 A1 | 3/2005 | Thoen | |
| 2005/0108177 A1 | 5/2005 | Sancho | |
| 2005/0144073 A1* | 6/2005 | Morrisroe et al. | 705/14 |
| 2005/0165684 A1 | 7/2005 | Jensen et al. | |
| 2005/0177562 A1 | 8/2005 | Raciborski | |
| 2005/0190901 A1 | 9/2005 | Oborn et al. | |
| 2005/0260973 A1 | 11/2005 | Van de Groenendaal | |
| 2006/0020508 A1 | 1/2006 | Gorti et al. | |
| 2006/0059044 A1 | 3/2006 | Chan et al. | |
| 2006/0080147 A1 | 4/2006 | Greenstein | |
| 2006/0085263 A1* | 4/2006 | Greer et al. | 705/14 |
| 2006/0085357 A1 | 4/2006 | Pizaro | |
| 2006/0111991 A1 | 5/2006 | Wilshinsky et al. | |
| 2006/0116924 A1 | 6/2006 | Angles et al. | |
| 2006/0123105 A1 | 6/2006 | Parekh et al. | |
| 2006/0190287 A1 | 8/2006 | Forshaw et al. | |
| 2006/0235795 A1 | 10/2006 | Johnson et al. | |
| 2006/0271953 A1 | 11/2006 | Jacoby et al. | |
| 2007/0050481 A1 | 3/2007 | Rigole | |
| 2007/0067297 A1 | 3/2007 | Kublickis | |
| 2007/0106607 A1 | 5/2007 | Seib et al. | |
| 2007/0220604 A1 | 9/2007 | Long | |
| 2007/0239546 A1 | 10/2007 | Blum et al. | |
| 2008/0095173 A1* | 4/2008 | Bugenhagen | 370/395.21 |
| 2008/0164308 A1 | 7/2008 | Aaron et al. | |
| 2008/0255944 A1 | 10/2008 | Shah et al. | |
| 2009/0172033 A1 | 7/2009 | Clark et al. | |
| 2010/0174660 A1 | 7/2010 | Clark et al. | |
| 2010/0205652 A1 | 8/2010 | Bouchard et al. | |
| 2011/0208663 A1 | 8/2011 | Kennis et al. | |

FOREIGN PATENT DOCUMENTS

| | | |
|---|---|---|
| CA | 2689479 | 12/2008 |
| CA | 2689863 | 12/2008 |
| EP | 1 126 732 A2 | 8/2001 |
| WO | WO 99/62210 | 12/1999 |
| WO | WO 99/66436 | 12/1999 |
| WO | WO 00/31630 | 6/2000 |
| WO | WO 01/67313 A1 | 9/2001 |
| WO | WO02/49257 | 6/2002 |
| WO | PCT/CA2007/001152 | 3/2007 |
| WO | PCT/CA2007/001865 | 8/2007 |
| WO | PCT/CA2007/001802 | 10/2007 |
| WO | PCT/CA2007/001921 | 10/2007 |
| WO | PCT/CA2007/002188 | 12/2007 |
| WO | PCT/CA2007/001865 | 2/2008 |
| WO | PCT/CA2007/001921 | 2/2008 |
| WO | PCT/CA2007/001152 | 3/2008 |
| WO | PCT/CA2007/001802 | 3/2008 |
| WO | PCT/CA2007/002119 | 3/2008 |
| WO | PCT/CA2007/002188 | 3/2008 |
| WO | PCT/CA2007/001921 | 3/2009 |
| WO | PCT/CA2007/001152 | 4/2009 |
| WO | PCT/CA2007/002188 | 4/2009 |

OTHER PUBLICATIONS

Non-Final Office Action issued by the United States Patent and Trademark Office on Jun. 21, 2011 in connection with U.S. Appl. No. 12/162,297, 5 pages.

http://www.ip2location.com/ip-country-region-city-latitude-longitude-zipcode.aspx, Copyright 2001-2008 IP2Location.com, Feb. 7, 2008, 3 pages.

http://www.location.com.my/, IP2Location.com Copyright 2001-2007, Feb. 7, 2008, 11 pages.

James A. Muir et al., Internet Geolocation and Evasion, School of Computer Science, Carleton University, Ottawa, Canada, Apr. 8, 2006, 22 pages.

J. Peterson, A Presence-based GEOPRIV Location Object Format, Internet Engineering Task Force (IETF), RFC 4119, Dec. 2005, 22 pages.

(56) References Cited

OTHER PUBLICATIONS

Non-Final Office Action issued by the United States Patent and Trademark Office on Jun. 24, 2011 in connection with U.S. Appl. No. 12/298,720, 10 pages.
Non-Final Office Action issued by the United States Patent and Trademark Office on Aug. 8, 2011 in connection with U.S. Appl. No. 12/087,427, 7 pages.
Office Action issued Oct. 18, 2011 in connection with U.S. Appl. No. 12/292,750, 35 pages.
Office Action issued Oct. 25, 2011 in connection with U.S. Appl. No. 12/226,880, 41 pages.
Office Action issued on Nov. 14, 2011 in connection with U.S. Appl. No. 12/087,427, 9 pages.
Office Action issued on Nov. 30, 2011 in connection with U.S. Appl. No. 12/162,297, 11 pages.
Office Action issued on Dec. 28, 2011 in connection with U.S. Appl. No. 12/227,709, 32 pages.
Office Action issued on Dec. 7, 2011 in connection with U.S. Appl. No. 12/298,720, 21 pages.
Examiner's Answer in Response to Appeal Brief issued by the United States Patent and Trademark Office on Dec. 20, 2012 in connection with U.S. Appl. No. 12/298,720, 10 pages.
Non-Final Office Action issued by the United States Patent and Trademark Office on Jan. 31, 2013 in connection with U.S. Appl. No. 12/314,735, 21 pages.
Non-Final Office Action issued by the United States Patent and Trademark Office on Feb. 15, 2013 in connection with U.S. Appl. No. 12/292,745, 9 pages.
IP2Location.com, "IP2Location.com Releases New Mar. 2007 Geolocation Database", PRLog (Press Release), Feb. 28, 2007, Bradenton, FL, 4 pages.
Final Office Action issued by the United States Patent and Trademark Office on Sep. 13, 2012 in connection with U.S. Appl. No. 12/602,236, 23 pages.
Non-Final Office Action issued by the United States Patent and Trademark Office on Nov. 15, 2012 in connection with U.S. Appl. No. 12/226,880, 27 pages.
Non-Final Office Action issued by the United States Patent & Trademark Office on Feb. 29, 2012 in connection with U.S. Appl. No. 12/602,236, 42 pages.
Final Office Action issued by the United States Patent & Trademark Office on May 3, 2012 in connection with U.S. Appl. No. 12/226,880, 26 pages.
Final Office Action issued by the United States Patent & Trademark Office on May 8, 2012 in connection with U.S. Appl. No. 12/292,750, 15 pages.
Examiner's Report issued on Jul. 9, 2012 in connection with Canadian Patent Application 2,654,400, 7 pages.
Examiner's Report issued on Jul. 26, 2012 in connection with Canadian Patent Application 2,689,072, 5 pages.
Examiner's Report issued on Jul. 25, 2012 in connection with Canadian Patent Application 2,633,227, 4 pages.
Office Action issued on Aug. 29, 2012 in connection with U.S. Appl. No. 12/292,745, 13 pages.
Examiner's Report issued on Jul. 18, 2012 in connection with Canadian Patent Application 2,690,090, 5 pages.
Examiner's Report issued on Jul. 18, 2012 in connection with Canadian Patent Application 2,690,030, 6 pages.
Examiner's Report issued on Jul. 18, 2012 in connection with Canadian Patent Application 2,689,479, 6 pages.
Final Office Action issued by the United States Patent and Trademark Office on Jul. 3, 2013 in connection with U.S. Appl. No. 12/292,745, 11 pages.
Final Office Action issued by the United States Patent and Trademark Office on Jul. 18, 2013 in connection with U.S. Appl. No. 12/314,735, 22 pages.
Images captured by www.archive.org ("the wayback machine"); snapshots of that http://www.ip2location.com; dated prior to May 30, 2007; referred to as ip2location, labeled pp. C-F attached.
Office Action mailed on Jun. 3, 2014 in connection with U.S. Appl. No. 12/087,427, 9 pages.
Examiner's Report issued on May 21, 2014 in connection with Canadian Patent Application 2,689,863, 4 pages.

* cited by examiner

METHODS AND SYSTEMS FOR PRESENTING ONLINE CONTENT ELEMENTS BASED ON INFORMATION CAUSED TO BE STORED ON A COMMUNICATION APPARATUS BY A SERVICE PROVIDER

CROSS-REFERENCE TO RELATED APPLICATION

This application claims priority from U.S. Provisional Patent Application No. 60/941,830 filed on Jun. 4, 2007 and hereby incorporated by reference herein.

FIELD OF THE INVENTION

The present invention relates generally to online content presented at a communication apparatus connected to a computer network such as the Internet, and, more particularly, to methods and systems for presenting online content elements based on information caused to be stored on a communication apparatus by a service provider.

BACKGROUND

When using a communication apparatus to access and interact with various network sites of a computer network such as the Internet, a user is presented with a wide variety of online content. For example, in addition to primary content of a network site being accessed, the user is often presented with advertising content that provides one or more online advertisements.

In order to improve their effectiveness, online advertisements presented to a user are typically targeted using various techniques that take into account different factors, such as online behavior of the user (i.e., behavioral targeting), a geographic location (e.g., a country or city) of the user, or the primary content of an accessed network site (i.e., contextual targeting). Although existing techniques are useful to some extent, their degree of advertisement targeting is limited by information that they use in determining which ads to present to users. In particular, since they are typically confined to using information that is derived from online activities of users (e.g., browsing histories, search engine queries, etc.) and/or that is insufficiently precise or specific (e.g., in terms of geographic location of users), existing ad targeting techniques are limited in their ability to precisely target ads to users.

Limitations similar to those imposed on existing ad targeting techniques are often imposed on techniques used to tailor or otherwise determine elements of primary content of a network site that are to be presented to a user. As such, in some cases, elements of primary content of a network site that are to be presented to a user may not be tailored or customized as precisely as the network site's operator may want, possibly adversely affecting the user's experience in visiting the network site.

For these and other reasons, there is a need for methods and systems that enable more precise targeting or tailoring of online advertisements or other online content elements that are presented to users.

SUMMARY OF THE INVENTION

In accordance with a first broad aspect, the present invention provides a method for presenting online content at a communication apparatus. The method comprises: obtaining information caused to be stored on the communication apparatus by a service provider providing network access to the communication apparatus, the information pertaining to a profile maintained by the service provider; determining an online content element to be presented at the communication apparatus based on the information; and causing the communication apparatus to present the online content element.

In accordance with a second broad aspect, the present invention provides a server for causing presentation of online content at a communication apparatus. The server comprises an interface for receiving and sending data and a processing unit coupled to the interface. The processing unit is operative for: obtaining information caused to be stored on the communication apparatus by a service provider providing network access to the communication apparatus, the information pertaining to a profile maintained by the service provider; and causing the communication apparatus to present an online content element determined based on the information.

In accordance with a third broad aspect, the present invention provides a computer-readable medium storing a program component for execution by a computer system to to cause presentation of online content at a communication apparatus. The program component comprises: first program code for causing the computer system to obtain information caused to be stored on the communication apparatus by a service provider providing network access to the communication apparatus, the information pertaining to a profile maintained by the service provider; and second program code for causing the computer system to cause the communication apparatus to present an online content element determined based on the information.

In accordance with a fourth broad aspect, the present invention provides a method for execution by a communication apparatus connected to a data network. The method comprises: storing in a memory of the communication apparatus information provided by a service provider providing network access to the communication apparatus, the information pertaining to a profile maintained by the service provider; and sending the information over the data network to allow a server to determine an online content element to be presented at the communication apparatus based on the information.

In accordance with a fifth broad aspect, the present invention provides a communication apparatus for connection to a data network. The communication apparatus comprises a memory storing information provided by a service provider providing network access to the communication apparatus, the information pertaining to a profile maintained by the service provider. The communication apparatus also comprises a processing unit for sending the information over the data network to allow a server to determine an online content element to be presented at the communication apparatus based on the information.

In accordance with a sixth broad aspect, the present invention provides a method for causing presentation of online advertisement content at a communication apparatus. The method comprises: obtaining location information caused to be stored on the communication apparatus by a service provider providing network access to the communication apparatus; and causing the communication apparatus to present an online advertisement determined based on the location information.

In accordance with a seventh broad aspect, the present invention provides a server for causing presentation of online advertising content at a communication apparatus. The server comprises an interface for receiving and sending data and a processing unit coupled to the interface. The processing unit is operative for: obtaining location information caused to be stored on the communication apparatus by a service provider providing network access to the communication apparatus; and causing the communication apparatus to present an online advertisement determined based on the location information.

These and other aspects of the invention will become apparent to those of ordinary skill in the art upon review of the following description of embodiments of the invention in conjunction with the accompanying drawings.

BRIEF DESCRIPTION OF THE DRAWINGS

A detailed description of embodiments of the present invention is provided herein below, by way of example only, with reference to the accompanying drawings, in which.

It is to be expressly understood that the description and drawings are only for purposes of illustration of example embodiments of the present invention and are an aid for understanding. They are not intended to be a definition of the limits of the invention.

DETAILED DESCRIPTION OF EMBODIMENTS

Figure 1:
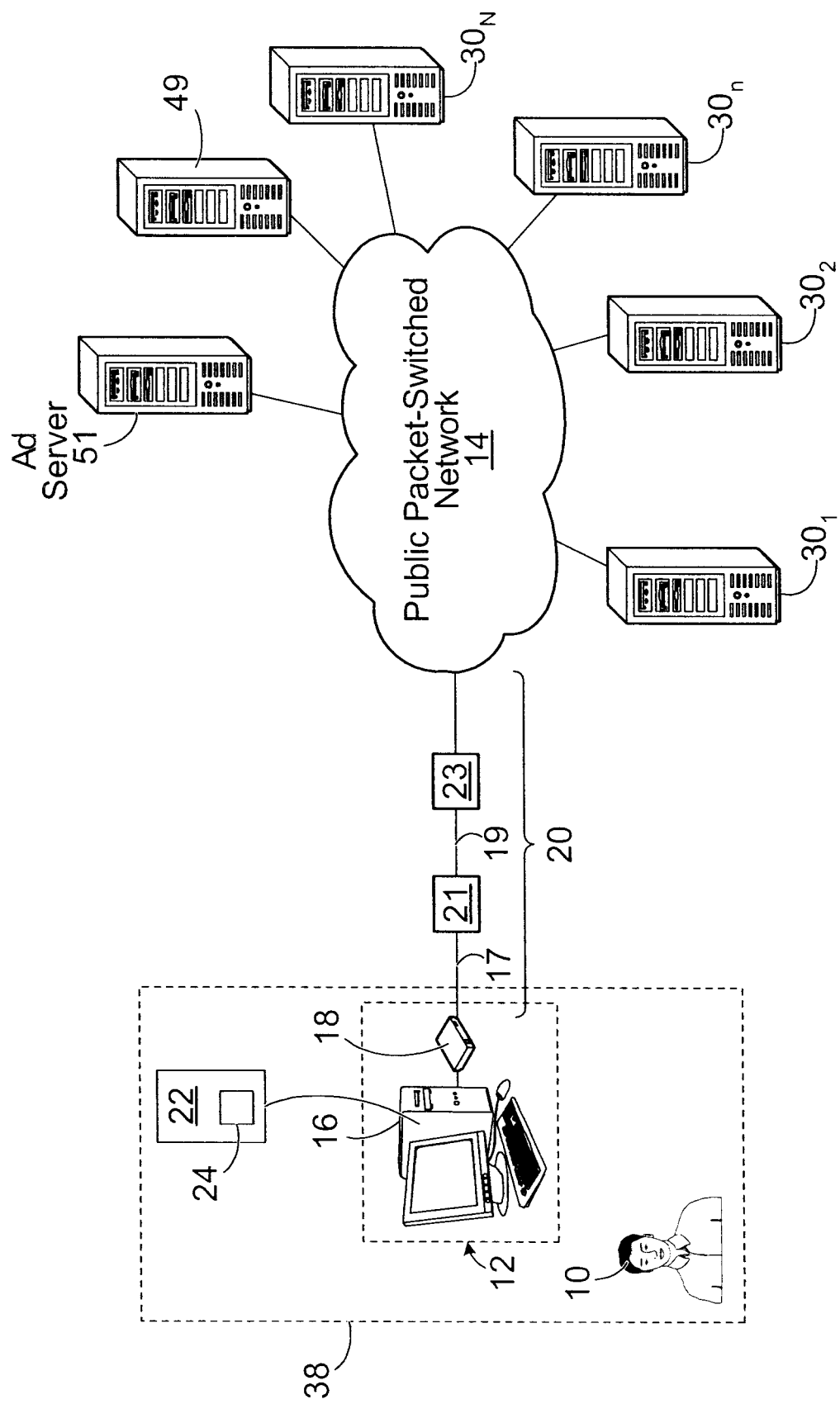
FIG. 1 shows an architecture allowing a user of a communication apparatus connected to a packet-switched network to access and interact with network sites of that network, in accordance with an embodiment of the present invention.

FIG. 1 depicts an architecture allowing a user 10 of a communication apparatus 12 connected to a public packet-switched network 14 (e.g., the Internet) to access and interact with network sites (e.g., web sites) of the network 14, in accordance with an embodiment of the present invention.

In this embodiment, the communication apparatus 12 comprises a computing device 16 and a network interface unit 18. For example, the computing device 16 may be implemented as a personal computer (PC) such as a desktop computer, a laptop computer, or a tablet PC. The computing device 16 is provided with at least one input device such as a keyboard, a mouse, a touchscreen, a stylus, a microphone, etc., as well as a display and possibly one or more other output devices (e.g., speakers) that enable interaction between the user 10 and the computing device 16. The computing device 16 is operative to run a software application implementing a network browser (e.g., a web browser) with which the user 10 can interact via the display (and possibly one or more other output devices) and the at least one input device in order to access and interact with network sites of the public packet-switched network 14.

The network interface unit 18 enables the communication apparatus 12 to exchange data with the public packet-switched network 14 via a network portion 20. For example, in various embodiments, and depending on the nature of the network portion 20, the network interface unit 18 may be implemented as a modem such as a broadband modem (e.g., a digital subscriber line (DSL) modem or a cable modem) or a narrowband modem (e.g., a dial-up modem). Although it is shown as being a separate component in FIG. 1, the network interface unit 18 may be integrated into the computing device 16 (e.g., it may be a card internal to the computing device 16).

While in this embodiment the communication apparatus 12 comprises the computing device 16 and the network interface unit 18, it will be appreciated that the communication apparatus 12 may comprise other components in other embodiments.

The network portion 20 may traverse one or more network components and comprise one or more physical links and one or more logical links. For example, the network portion 20 may comprise a physical link 17 between the network interface unit 18 and a network component 21. The physical link 17 may comprise a copper twisted pair, a coax cable, an Ethernet link, a fiber optic link (e.g., fiber to the premises (FTTP)), a wireless link, a satellite link, or a combination thereof. Depending on the nature of the physical link 17, the network component 21 may be a DSL access multiplexer (DSLAM), a cable modem termination system (CMTS), or another type of network component. The network portion 20 may also comprise a dedicated logical link 19 between the network component 21 and another network component 23 that provides access to the public packet-switched network 14. For instance, the network component 23 may be a network access server (NAS), a router, etc. It will be appreciated that the network portion 20 may take on many forms in various embodiments.

In order to exchange data over the public packet-switched network 14, the communication apparatus 12 is assigned a logical identifier. The logical identifier, which may be assigned to the computing device 16 or the network interface unit 18, may be an Internet Protocol (IP) address (e.g., in compliance with IPv4 or IPv6) or a proprietary address, label or tag. The logical identifier may be statically assigned to the communication apparatus 12 in which case it does not change over time (e.g., a static IP address). Alternatively, the logical identifier may be dynamically assigned to the communication apparatus 12 in which case it may change over time (e.g., a dynamic IP address).

For example, the logical identifier may be assigned to the communication apparatus 12 by a network component that is part of the network portion 20 (e.g., the network component 23 in embodiments where it is a network access server). This network component may assign the logical identifier to the communication apparatus 12 when the communication apparatus 12 is activated (e.g., when the network interface unit 18 and/or the computing device 16 is/are powered-up) or otherwise regains network connectivity and/or at certain time intervals which may range from an hour or less to several months or more. For instance, in embodiments where the logical identifier is a dynamic IP address, the network component assigning the dynamic IP address to the communication apparatus 12 may do so in accordance with the Dynamic Host Configuration Protocol (DHCP) using a pool of IP addresses accessible to that network component. It will be recognized that assignment of the logical identifier to the communication apparatus 12 may be effected in various ways in various embodiments.

The computing device 16 comprises a memory 22 which, in accordance with an embodiment of the present invention, stores information 24 pertaining to a profile maintained by a service provider providing network access (in this case, access to the public packet-switched network 14) to the communication apparatus 12. For ease of reference, the information 24 will hereinafter be referred to as "profile information".

The service provider can be a communications service provider (CSP) such as an access service provider (ASP, also sometimes called a regional access network provider (RANP)) that may or may not be an internet service provider (ISP). The service provider operates a network component that allows the communication apparatus 12 to access the public packet-switched network 14. For example, in this embodiment, it will be assumed that the service provider operates the network component 23, which, as mentioned above, may be a NAS.

The profile information 24 stored in the memory 22 may take on many forms in various embodiments. For example, the profile information 24 may include one or more of:

Location information regarding the communication apparatus 12. This location information specifies a physical location of the communication apparatus 12.

For example, in some embodiments, the location information may specify a location of a service point 38 where the communication apparatus 12 is located. The service point 38 refers to a physical point where the service provider provides a network access service to the user 10 of the communication apparatus 12. For example, the service point 38 may be a house or other building (or an area thereof). The location of the service point 38, which is hereinafter referred to as the "service point location", may be expressed as a civic address (e.g., a service address), a set of geo-coordinates, or any other information identifying where the service point is located.

In other embodiments, the location information may specify a current position of the communication apparatus 12, as detected or measured by other means (e.g., triangulation, detection of an access point to which the communication apparatus 12 is connected).

The location specified by the location information may constitute a geo location (latitude, longitude, elevation, and a datum which identifies a coordinate system used, such as, without limitation, the World Geodetic System 1984 (WGS841) datum). Alternatively or in addition, the location specified by the location information may constitute a civic location (a set of elements that describe detailed street address information). Still other forms of location information may be used to specify the location of the communication apparatus 12.

In a specific non-limiting embodiment, the location information may constitute a "location object" that may be formatted as a Presence Information Data Format Location Object (PIDF-LO) as defined by the Internet Engineering Task Force (IETF) in RFC 4119 draft-ietf-geopriv-pdif-lo-profile-10.txt and draft-ietf-geopriv-revised-civic-lo-06.txt available from http://tools.ietf.org/wg/geopriv/ and hereby incorporated by reference herein.

Personal information regarding a party (which may or may not be the user 10) to which the service provider provides a network access service. For instance, this personal information may include a name, a gender, a date of birth or an age, a nationality, a correspondence language, a civic address (e.g., a residential or work address), a phone number (e.g., a residential, work, VoIP or mobile phone number), an email address, an instant messaging (IM) identifier, and/or financial information (e.g., credit or debit card information, bank account information, or other information used to pay for the network access service) of the party. Other personal information regarding the party may be included. Also, in some cases, the party may be more than one person, in which cases the personal information may include respective personal information regarding each such person. The personal information regarding the party may be obtained by the service provider as a result of interaction between the party and the service provider (e.g., during a registration or service activation phase).

Presence information regarding a party (which may or may not be the user 10) to which the service provider provides a network access service. For instance, this presence information may include a presence state (e.g., online, offline, away, busy, etc.) indicative of an ability and willingness of the party to communicate. Also, in cases where the party is more than one person, respective presence information regarding each such person may be included.

A bandwidth available to the communication apparatus 12.

These examples of information potentially included the profile information 24 are presented for illustrative purposes only and should not be considered limiting in any respect. Generally, the profile information 24 can include any information known to the service provider providing network access to the communication apparatus 12.

The service provider causes storage of the profile information 24 in the memory 22 of the computing device 16. In that sense, the profile information 24 can be viewed as a "cookie" stored in the communication apparatus 12 by the service provider.

For example, in some embodiments, the service provider may maintain a database (not shown) containing profiles associated with various parties to which the service provider provides a network access service, including the profile to which pertains the profile information 24. Upon receiving a request for network access by the communication apparatus 12 (e.g., when the network interface unit 18 and/or the computing device 16 is/are powered up), the network component 23 may assign the logical identifier to the communication apparatus 12. In addition, the network component 23 may also cause the profile information 24 to be stored in the memory 22 of the computing device 16. For instance, the network component 23 may obtain the profile information 24 from the aforementioned database (either by directly accessing the database or by communicating with a server having access to the database) and may send the profile information 24 so-obtained to the communication apparatus 12 via the network portion 20. The communication apparatus 12 may then proceed to store the profile information 24 in the memory 22. A more detailed example of how this can be achieved is provided later on. Naturally, it will be appreciated that the service provider may cause the profile information 24 to be stored in the communication apparatus 12 in various other ways in other embodiments.

As mentioned previously, the user 10 can use the communication apparatus 12 to access and interact with network sites of the public packet-switched network 14. These network sites are implemented by servers $30_1 \ldots 30_N$ connected to the public packet-switched network 14. The servers 30$_1$ ... 30$_N$ and the network sites that they implement are operated, managed or otherwise associated with various entities, including, for example, corporations, governmental organizations, non-profit organizations, and individuals.

Each of the servers 30$_1$ ... 30$_N$ comprises suitable hardware, firmware, software, control logic, or a combination thereof for implementing a plurality of functional elements, including an interface and a processing unit. The interface of each of the servers 30$_1$ ... 30$_N$ is adapted to receive and send data (e.g., in the form of messages) from and to communication apparatuses (such as the communication apparatus 12) connected to the public packet-switched network 14 as well as other components (e.g., computers or databases) communicatively coupled to that server but not necessarily connected to the network 14. The processing unit of each of the servers 30$_1$ ... 30$_N$ is adapted to effect various processing operations to implement that server's functionality.

When the user 10 uses the communication apparatus 12 to access a network site implemented by a server 30$_n$ (1≤n≤N), the network browser implemented by the computing device 16 interacts with the server 30$_n$ in order to allow the user 10 to view, hear or otherwise be presented with online content via the display and/or one or more other output devices of the computing device 16. While interacting with the network site, the user 10 may also input information (e.g., by entering text, selecting an option, etc.) and/or one or more commands (e.g., by clicking on a graphical button or a hyperlink) via the at least one input device of the computing device 16.

The online content presented to the user 10 when he/she accesses or interacts with the network site implemented by the server 30$_n$ comprises various online content elements. An online content element can include any information visually and/or aurally presentable to the user 10 when he/she accesses or interacts with the network site. For example, an online content element may include text, one or more images, one or more videos, one or more sounds, one or more animations, one or more hyperlinks, one or more links to downloadable files, one or more interactive features (e.g., games, maps, etc.), and/or other information that can be presented to the user 10 when he/she accesses or interacts with the network site. In some cases, an online content element may constitute an entire online page (e.g., web page), while in other cases it may constitute a portion (e.g., text, an image, a video, and/or sound) of such a page. In addition, in some cases, an online content element may be part of a window containing a currently-displayed page of the network site, while in other cases it may be part of another window (e.g., a pop-up window) that is separate from the window containing the currently-displayed page of the network site.

Also, the online content presented to the user 10 when he/she accesses or interacts with the network site implemented by the server 30$_n$ comprises primary content and possibly advertising content.

The primary content serves to provide a primary function of the network site implemented by the server 30$_n$. For example: where the network site is a search engine site, the primary content serves to provide searching functionality and search results to the user 10; where the network site is a commercial site associated with a company, the primary content serves to provide information on the company or its products and/or services; where the network site is a personal site associated with a person, the primary content serves to provide information on the person; where the network site is a news site, the primary content serves to provide news; where the network site is a map and/or directions site, the primary content serves to provide maps and/or directions; etc.

The advertising content, if any, serves to provide one or more online advertisements. Each online advertisement is a paid online announcement designed to attract public attention to promote, for instance, an entity (e.g., a company or other organization), a product, a service, or an event. For example, an online advertisement may be a banner ad, a vertical banner ad, a skyscraper ad, a pop-up ad, a pop-under ad, an interstitial ad, a floating ad, an expanding ad, a trick banner ad, a video ad, or any other type of online ad.

Thus, online content elements presented to the user 10 when he/she accesses or interacts with the network site implemented by the server 30$_n$ comprise one or more primary content elements, and possibly one or more advertising content elements forming one or more online advertisements.

Sometimes, while he/she uses the communication apparatus 12 to interact with the network site implemented by the server 30$_n$, the user 10 may click on a hyperlink that results in the communication apparatus 12 accessing a network site implemented by another one of the servers 30$_1$ ... 30$_N$, in which case the network browser implemented by the computing device 16 interacts with the other one of the servers 30$_1$ ... 30$_N$ in order to allow the user 10 to be presented with other online content that comprises other online content elements. Similarly, in some situations, upon accessing the network site implemented by the server 30$_n$, the server 30$_n$ may automatically redirect the communication apparatus 12 to access a network site implemented by another one of the servers 30$_1$ ... 30$_N$, in which case the network browser implemented by the computing device 16 interacts with the other one of the servers 30$_1$ ... 30$_N$ in order to allow the user 10 to be presented with other online content that comprises other online content elements.

Accordingly, as the user 10 uses the communication apparatus 12 to access and interact with network sites implemented by the servers 30$_1$ ... 30$_N$, he/she is presented with various online content elements.

When the User 10 uses the communication apparatus 12 to access and interact with the network site implemented by the server 30$_n$, each of the online content elements presented at the communication apparatus 12 is determined and provided by the server 30$_n$, an ad server 51 associated with the server 30$_n$, or another network component 49 (e.g., a media server providing pictures, videos, audio clips, and/or other media) external to the server 30$_n$ but linked thereto or otherwise associated therewith. Communication between the communication apparatus 12 and the ad server 51 and/or the network component 49 may take place over a link established over the public packet-switched network 14 and possibly another network. Typically, the one or more primary content elements presented at the communication apparatus 12 are determined and provided by the server 30$_n$, although in certain cases one or more of these primary content elements may be determined and provided by the network component 49. For their part, the one or more advertising content elements (forming one or more online advertisements) presented at the communication apparatus 12, if any, are typically determined and provided by the ad server 51.

The ad server 51 comprises suitable hardware, firmware, software, control logic, or a combination thereof for implementing a plurality of functional elements, including an interface and a processing unit. The interface of the ad server 51 is adapted to receive and send data (e.g., in the form of messages) from and to servers, other computers and/or other components (e.g., databases). The processing unit of the ad server 51 is adapted to effect various processing operations to implement that server's functionality. Although it is shown as a component distinct from the server $30_n$, in some embodiments, the ad server 51 may be managed by an entity operating the server $30_n$. In particular, in some embodiments, the ad server 51 and the server $30_n$ may be implemented by a common computing element.

Similarly, the network component 49 comprises suitable hardware, firmware, software, control logic, or a combination thereof for implementing a plurality of functional elements, including an interface and a processing unit. The interface of the network component 49 is adapted to receive and send data (e.g., in the form of messages) from and to servers, other computers and/or other components (e.g., databases). The processing unit of the network component 49 is adapted to effect various processing operations to implement that component's functionality.

In accordance with an embodiment of the present invention, the server $30_n$, the ad server 51 and/or the network component 49 can interact with the communication apparatus 12 to obtain the profile information 24 stored on the communication apparatus 12 in order to determine one or more online content elements to be presented at the communication apparatus 12 when the user 10 accesses or interacts with the network site implemented by the server $30_n$.

Figure 2:
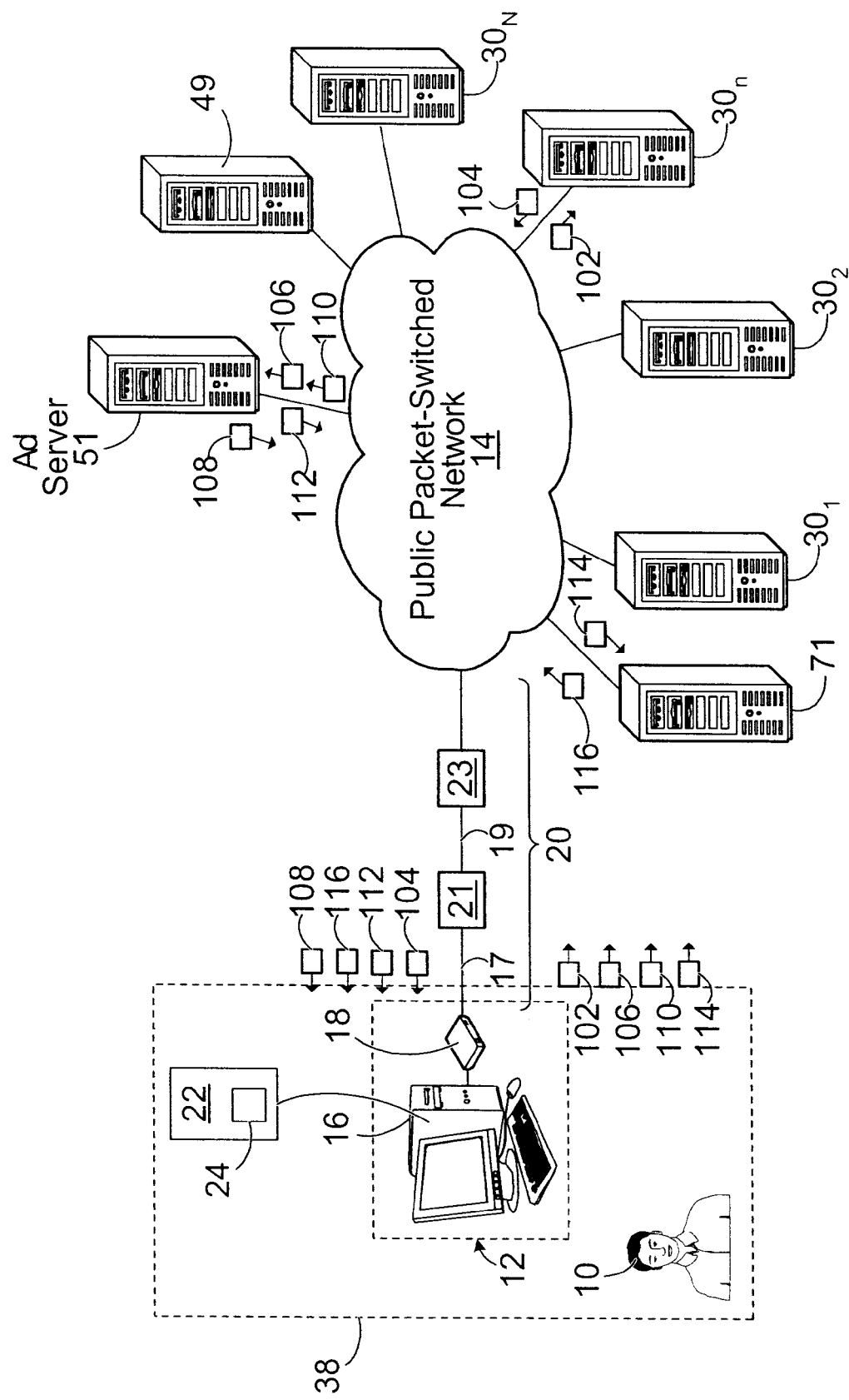
FIG. 2 shows an example of data exchanged between various components of the architecture shown in FIG. 1 when the user uses the communication apparatus to access a network site of the packet-switched network, in accordance with an embodiment of the present invention.

With reference to FIG. 2, interaction between the communication apparatus 12, the server $30_n$, the ad server 51, and/or the network component 49 will be illustrated in the context of an example where the user 10 uses the communication apparatus 12 to access and interact with the network site implemented by the server $30_n$.

The user 10 uses the computing device 16 of the communication apparatus 12 in order to access the network site implemented by the server $30_n$. This may involve the user 10 entering in the browser implemented by the computing device 16 a domain name that is associated with the network site implemented by the server $30_n$, or clicking on a hyperlink that is present on a page currently displayed by the browser and that identifies the network site implemented by the server $30_n$.

In response to this input by the user 10, the communication apparatus 12 proceeds to access the network site implemented by the server $30_n$. More particularly, possibly after interacting with a domain name server (DNS) to obtain a logical identifier (e.g., an IP address) associated with the server $30_n$, the communication apparatus 12 transmits data 102 to the server $30_n$. The data 102 conveys the logical identifier assigned to the communication apparatus 12 and serves to request online content associated with the network site implemented by the server $30_n$.

Upon receiving the data 102, the server $30_n$ processes it so as to cause the communication apparatus 12 to present online content elements associated with the network site implemented by the server $30_n$. For instance, the online content elements to be presented at the communication apparatus 12 may form a page of the network site implemented by the server $30_n$.

Thus, upon processing the data 102, and based on the logical identifier assigned to the communication apparatus 12, the server $30_n$ sends to the communication apparatus 12 data 104 to cause the communication apparatus 12 to present the online content elements associated with the network site implemented by the server $30_n$. More particularly, the data 104, when processed by the browser implemented by the computing device 16, enables the computing device 16 to present the online content elements associated with the network site implemented by the server $30_n$. For example, the data 104 may represent a hypertext markup language (HTML) file including portions (e.g., tags) that allow the browser implemented by the computing device 16 to present the online content elements associated with the network site implemented by the server $30_n$. In other examples, the data 104 may convey the online content elements themselves or redirect the browser implemented by the computing device 16 to another network site from which may be obtained the online content elements.

For purposes of this example, it is assumed that, in addition to one or more primary content elements of the network site implemented by the server $30_n$, the online content elements to be presented to the user 10 at the communication apparatus 12 include an advertising content element forming an online advertisement, where this online advertisement is to be selected by the ad server 51. As such, the data 104 conveys a pointer to the ad server 51 in order to allow the communication apparatus 12 to present the advertising content element forming the online advertisement to be selected by the ad server 51. On a basis of this pointer, the browser implemented by the computing device 16 sends data 106 to the ad server 51. The data 106 conveys the logical identifier assigned to the communication apparatus 12 and serves to request the advertising content element forming the online advertisement to be selected by the ad server 51.

Upon receiving the data 106, the ad server 51 processes it so as to determine the advertising content element forming the online advertisement to be presented at the communication apparatus 12. This determination may involve the ad server 51 selecting the online advertisement to be presented at the communication apparatus 12 from a number of available online advertisements. The ad server 51 may proceed to make this determination based on various factors, such as business rules or agreements between advertisers and an entity operating the network site implemented by the server $30_n$, online behavior of the user 10 (i.e., behavioral targeting), a geographic location (e.g., a country or city) of the user 10, primary content of the network site implemented by the server $30_n$ (i.e., contextual targeting), etc.

As part of its operation, and in accordance with an embodiment of the present invention, the ad server 51 interacts with the communication apparatus 12 in order to obtain the profile information 24 stored on the communication apparatus 12 and determine the online advertisement to be presented at the communication apparatus 12 based (at least in part) on the obtained profile information 24.

Thus, the ad server 51 proceeds to transmit data 108 to the communication apparatus 12. The data 108 serves to request the profile information 24 stored on the communication apparatus 12.

Upon receipt of the data 108 at the communication apparatus 12, the browser implemented by the computing device 16 retrieves the profile information 24 from the memory 22 and proceeds to transmit data 110 conveying the profile information 24 to the ad server 51. In some cases, the data 110 may be encrypted by the computing device 16 prior to being transmitted to the ad server 51. Such encryption may be effected using any suitable encryption technique (e.g., the Secure Socket Layer (SSL) protocol), by virtue of interaction between the computing device 16 and the ad server 51.

Upon receiving the data 110, the ad server 51 processes the data 110 (possibly decrypting it) in order to obtain the profile information 24. On a basis of the profile information 24 and possibly other information (e.g., business rules or agreements between advertisers and the entity operating the network site implemented by the server 30n, the online behavior of the user 10, etc.), the ad server 51 proceeds to determine the advertising content element forming the online advertisement to be presented at the communication apparatus 12. That is, the ad server 51 uses the profile information 24 as a factor to determine the online advertisement to be presented at the communication apparatus 12.

For purposes of this example, it is assumed that the profile information 24 stored on the communication apparatus 12 and conveyed by the data 110 received by the ad server 51 includes the service point location of the communication apparatus 12, i.e., the location of the service point 38 where the service provider provides a network access service to the user 10 of the communication apparatus 12. Accordingly, for purposes of this example, it is assumed that the ad server 51 determines the advertising content element forming the online advertisement to be presented at the communication apparatus 12 based on the service point location of the communication apparatus 12.

For example, where the online advertisement to be presented at the communication apparatus 12 is to be selected from a number of available online advertisements for different stores, restaurants or other commercial establishments, the ad server 51 may select the online advertisement to be presented at the communication apparatus 12 such that it advertises the store, restaurant or other commercial establishment which is closest to the service point location of the communication apparatus 12. As another example, where the online advertisement to be presented at the communication apparatus 12 is to be selected from a number of available online advertisements for a company or a product or service offered thereby, the ad server 51 may select the online advertisement to be presented at the communication apparatus 12 such that it advertises the company, product or service along with a branch, authorized distributor or other place that provides the product or service and that is closest to the service point location of the communication apparatus 12. As yet another example, where the service point 38 where the communication apparatus 12 is located has a specific geographic condition, the ad server 51 may select the online advertisement to be presented at the communication apparatus 12 such that it advertises a product or service that is more likely to be of potential interest to a party (such as the user 10) located at a place with this specific geographic condition than to a party located at a place which does not have this specific geographic condition (e.g., where the communication apparatus 12 is located on a waterfront property, the ad server 51 may select the online advertisement to be presented at the communication apparatus 12 such that it advertises a boat, boating equipment or a service related to boats).

It will be appreciated that these examples are presented for illustrative purposes only as the ad server 51 can use the service point location of the communication apparatus 12 in various other ways to determine the online advertisement to be presented at the communication apparatus 12. It will also be appreciated that the service point location of the communication apparatus 12 may be one of several factors that are taken into consideration by the ad server 51 in determining the online advertisement to be presented at the communication apparatus 12.

Upon determining the online advertisement to be presented at the communication apparatus 12, the ad server 51 sends data 112 to the communication apparatus 12 to cause the communication apparatus 12 to present the advertising content element forming the online advertisement selected by the ad server 51. More particularly, the data 112, when processed by the browser implemented by the computing device 16, enables the computing device 16 to present the advertising content element forming the online advertisement selected by the ad server 51.

In one embodiment, the data 112 may represent a HTML file including a portion (e.g., a tag) that allows the browser implemented by the computing device 16 to present the advertising content element forming the online advertisement selected by the ad server 51. For instance, the HTML file may identify a location where resides data (e.g., a file or other document) representing the advertising content element that forms the online advertisement selected by the ad server 51. For purposes of this example, it is assumed that the data representing the advertising content element that forms the online advertisement selected by the ad server 51 resides on a network component 71 (e.g., a media or creative server). In some cases, the data representing the advertising content element that forms the online advertisement selected by the ad server 51 may reside on the ad server 51 or a component (e.g., a database) connected thereto. In other words, in some cases, functionality of the ad server 51 and the network component 71 (and possibly the server $30_n$) may be implemented by a common computing element. The online advertisement may be a banner ad, a vertical banner ad, a skyscraper ad, a pop-up ad, a pop-under ad, an interstitial ad, a floating ad, an expanding ad, a trick banner ad, a video ad, or any other type of online advertisement.

When it receives the data 112, the communication apparatus 12 processes the data 112 and identifies the network component 71 where resides the advertising content element that forms the online advertisement selected by the ad server 51. The communication apparatus 12 proceeds to send data 114 to the network component 71. The data 114 conveys the logical identifier assigned to the communication apparatus 12 and serves to request the advertising content element forming the online advertisement selected by the ad server 51.

Upon receiving the data 114, the network component 71 processes it and proceeds to transmit to the communication apparatus 12 data 116 representing the advertising content element forming the online advertisement selected by the ad server 51.

By processing the data 116 received from the network component 71 and the data 104 received from the server $30_n$, the browser implemented by the computing device 16 causes the display and/or one or more other output devices of the computing device 16 to present the online content elements associated with the network site implemented by the server $30_n$, including the one or more primary content elements of the network site implemented by the server $30_n$ and the online advertisement selected by the ad server 51.

It will thus be appreciated that, as the online advertisement presented to the user 10 is selected by the ad server 51 taking into account the service point location of the communication apparatus 12, this online advertisement may be targeted in a precise manner that is unachievable using other techniques. More particularly, as it is determined based on information pertaining to a profile maintained by the service provider providing network access to the communication apparatus 12, in this case, the service point location of the communication apparatus 12, the online advertisement presented to the user 10 may be targeted in terms of spatial location with a degree of precision that is much greater than that of other techniques. This may result in the online advertisement presented to the user 10 having a greater potential for being clicked on, selected or otherwise acted upon by the user 10 and, hence, having a greater effectiveness.

While the above-described example illustrates one possible manner of using the profile information 24 stored on the communication apparatus 12 in order to determine the online advertisement to be presented at the communication apparatus 12, it will be appreciated that use of the profile information 24 may be effected in various other manners in other embodiments.

Figure 3:
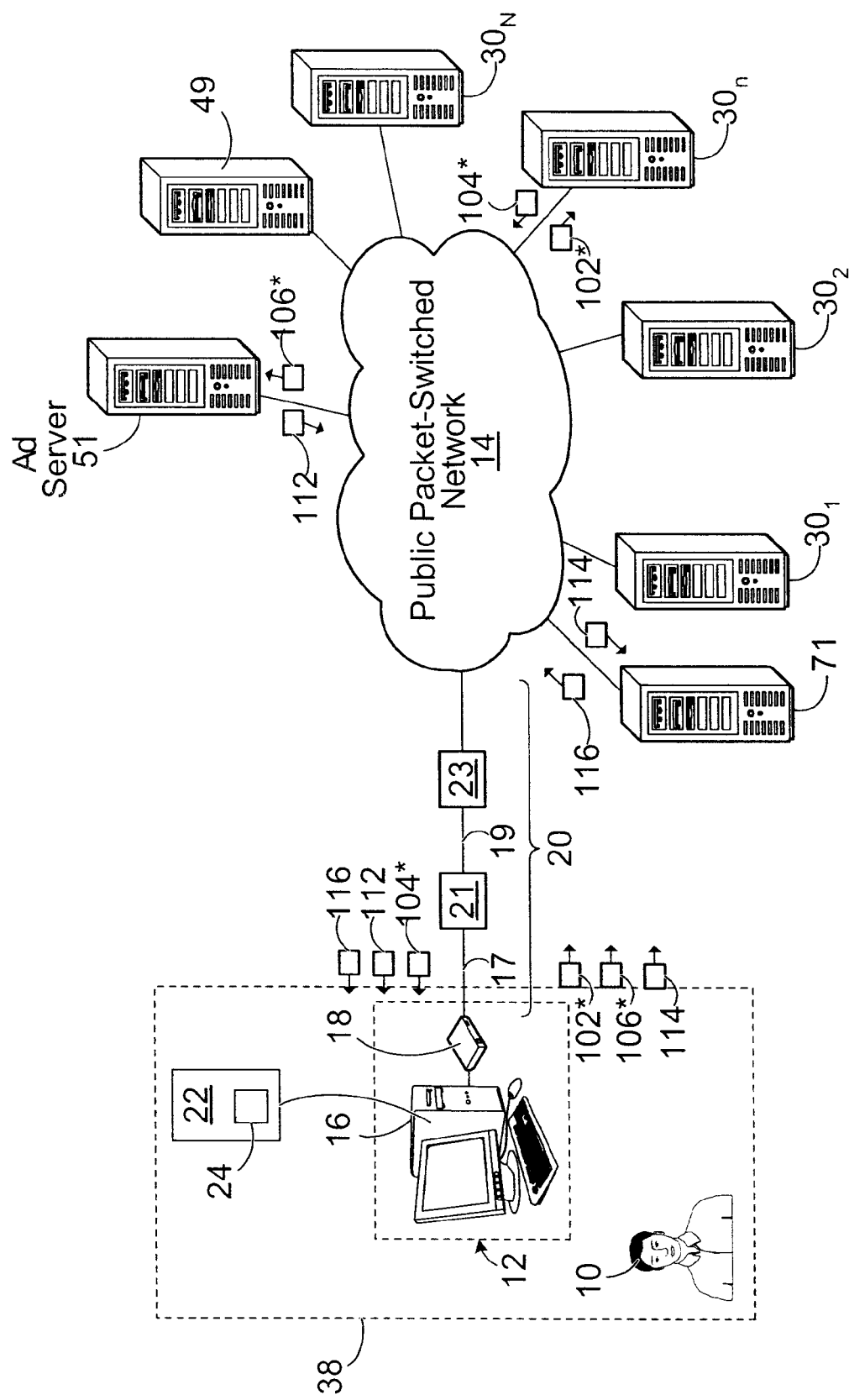
FIG. 3 shows another example of data exchanged between various components of the architecture shown in FIG. 1 when the user uses the communication apparatus to access a network site of the packet-switched network, in accordance with another embodiment of the present invention.

For example, FIG. 3 illustrates an alternative embodiment. In this embodiment, as described in the previous example, in response to the user 10 using the computing device 16 to input information for accessing the network site implemented by the to server $30_n$ (e.g., by entering in the browser implemented by the computing device 16 a domain name that is associated with the network site implemented by the server $30_n$, or clicking on a hyperlink that is present on a page currently displayed by the browser and that identifies the network site implemented by the server $30_n$), the communication apparatus 12 proceeds to access the network site implemented by the server $30_n$. More particularly, the communication apparatus 12 transmits data 102* to the server $30_n$. The data 102* conveys the logical identifier assigned to the communication apparatus 12 and serves to request online content associated with the network site implemented by the server $30_n$.

In addition, in this embodiment, the data 102* conveys the profile information 24 stored in the memory 22 of the computing device 16. That is, in this embodiment, the communication apparatus 12 transmits the profile information 24 to the server $30_n$ without the server $30_n$ having requested this information. In some cases, this may occur because the communication apparatus 12 is configured to transmit the profile information 24 to any one of the servers $30_1 \ldots 30_N$ that implements a network site which is accessed using the communication apparatus 12. In other cases, this may occur because the network site implemented by the server $30_n$ is a trusted network site. For instance, the network site implemented by the server $30_n$ may be owned, managed or otherwise controlled by a reputable or well-established company or other entity that is trusted by the service provider operating the network component 23. In some situations, this trust relationship may be established based on an agreement between the service provider operating the network component 23 and the entity controlling the network site implemented by the server $30_n$. In these cases, a list of one or more trusted network sites may be accessible to the browser implemented by the computing device 16 such that, upon detecting that the user 10 is attempting to access the network site implemented by the server $30_n$, the browser implemented by the computing device 16 determines that this network site is a trusted network site.

Upon receiving the data 102*, the server $30_n$ processes the data 102* so as to cause the communication apparatus 12 to present online content elements associated with the network site implemented by the server $30_n$. For instance, the online content elements to be presented at the communication apparatus 12 may form a page of the network site implemented by the server $30_n$.

Based on the logical identifier assigned to the communication apparatus 12, the server $30_n$ sends to the communication apparatus 12 data 104* to cause the communication apparatus 12 to present the online content elements associated with the network site implemented by the server $30_n$. More particularly, the data 104*, when processed by the browser implemented by the computing device 16, enables the computing device 16 to present the online content elements associated with the network site implemented by the server $30_n$. For example, the data 104* may represent a HTML file including portions (e.g., tags) that allow the browser implemented by the computing device 16 to present the online content elements associated with the network site implemented by the server $30_n$.

For purposes of this example, it is assumed that, in addition to one or more primary content elements of the network site implemented by the server $30_n$, the online content elements to be presented to the user 10 at the communication apparatus 12 include an advertising content element forming an online advertisement, where this online advertisement is to be selected by the ad server 51. As such, the data 104* conveys a pointer to the ad server 51 in order to allow the communication apparatus 12 to present the advertising content element forming the online advertisement to be selected by the ad server 51.

In addition, in this embodiment, the server $30_n$ generates the data 104* so that it conveys the profile information 24 (which was received as part of the data 102*) for use by the ad server 51. More specifically, in this embodiment, the server $30_n$ generates the data 104* such that it associates the profile information 24 with the pointer to the ad server 51 so as to cause the browser implemented by the computing device 16 to transmit the profile information 24 to the ad server 51 when using the pointer to contact the ad server 51. In other embodiments, the server $30_n$ may generate the data 104* so that it conveys certain information for use by the ad server 51, where this certain information is dependent on the profile information 24 without necessarily conveying the profile information 24 itself (e.g., a code to be used by the ad server 51 in determining the online advertisement to be presented at the communication apparatus 12).

Upon receiving the data 104*, and based on the pointer to the ad server 51 and the profile information 24 (or certain information dependent thereon such as a code) which is associated with that pointer in the data 104*, the browser implemented by the computing device 16 sends data 106* to the ad server 51. The data 106* conveys the logical identifier assigned to the communication apparatus 12 and the profile information 24, and serves to request the advertising content element forming the online advertisement to be selected by the ad server 51.

Upon receiving the data 106*, the ad server 51 processes it so as to determine the advertising content element forming the online advertisement to be presented at the communication apparatus 12. This determination may involve the ad server 51 selecting the online advertisement to be presented at the communication apparatus 12 from a number of available online advertisements. The ad server 51 may proceed to make this determination based on various factors, such as business rules or agreements between advertisers and an entity operating the network site implemented by the server $30_n$, online behavior of the user 10 (i.e., behavioral targeting), a geographic location (e.g., a country) of the user 10, primary content of the network site implemented by the server $30_n$ (i.e., contextual targeting), etc.

More specifically, in this example, the ad server 51 proceeds to determine the advertising content element forming the online advertisement to be presented at the communication apparatus 12 based on the profile information 24 conveyed by the data 106* and possibly other information (e.g., business rules or agreements between advertisers and the entity operating the network site implemented by the server $30n$, the online behavior of the user 10, etc.). That is, the ad server 51 uses the profile information 24 as a factor to determine the online advertisement to be presented at the communication apparatus 12.

For purposes of this example, it is assumed that the profile information 24 stored on the communication apparatus 12 and conveyed by the data 106* received by the ad server 51 includes the service point location of the communication apparatus 12, i.e., the location of the service point 38 where the service provider provides a network access service to the user 10 of the communication apparatus 12. Accordingly, for purposes of this example, it is assumed that the ad server 51 determines the advertising content element forming the online advertisement to be presented at the communication apparatus 12 based on the service point location of the communication apparatus 12.

For example, where the online advertisement to be presented at the communication apparatus 12 is to be selected from a number of available online advertisements for different stores, restaurants or other commercial establishments, the ad server 51 may select the online advertisement to be presented at the communication apparatus 12 such that it advertises the store, restaurant or other commercial establishment which is closest to the service point location of the communication apparatus 12. As another example, where the online advertisement to be presented at the communication apparatus 12 is to be selected from a number of available online advertisements for a company or a product or service offered thereby, the ad server 51 may select the online advertisement to be presented at the communication apparatus 12 such that it advertises the company, product or service along with a branch, authorized distributor or other place that provides the product or service and that is closest to the service point location of the communication apparatus 12. As yet another example, where the service point 38 where the communication apparatus 12 is located has a specific geographic condition, the ad server 51 may select the online advertisement to be presented at the communication apparatus 12 such that it advertises a product or service that is more likely to be of potential interest to a party (such as the user 10) located at a place with this specific geographic condition than to a party located at a place which does not have this specific geographic condition (e.g., where the communication apparatus 12 is located on a waterfront property, the ad server 51 may select the online advertisement to be presented at the communication apparatus 12 such that it advertises a boat, boating equipment or services related to boats).

It will be appreciated that these examples are presented for illustrative purposes only as the ad server 51 can use the service point location of the communication apparatus 12 in various other ways to determine the online advertisement to be presented at the communication apparatus 12. It will also be appreciated that the service point location of the communication apparatus 12 may be one of several factors that are taken into consideration by the ad server 51 in determining the online advertisement to be presented at the communication apparatus 12.

Upon determining the online advertisement to be presented at the communication apparatus 12, the ad server 51 sends data 112 to the communication apparatus 12 to cause the communication apparatus 12 to present the advertising content element forming the online advertisement selected by the ad server 51.

This example then proceeds as described above in connection with FIG. 2, leading to the browser implemented by the computing device 16 processing the data 116 received from the network component 71 and the data 104* received from the server $30_n$, so as to cause the display and/or one or more other output devices of the computing device 16 to present the online content elements associated with the network site implemented by the server $30_n$, including the one or more primary content elements of the network site implemented by the server $30_n$ and the online advertisement selected by the ad server 51.

While the above-described embodiment illustrates another possible manner of using the profile information 24 stored on the communication apparatus 12 in order to determine the online advertisement to be presented at the communication apparatus 12, it will be appreciated that use of the profile information 24 may be effected in various other manners in other embodiments. For example, in some embodiments, the server $30_n$ may interact with the communication apparatus 12 to obtain the profile information 24 stored thereon and may transmit the profile information 24 so-obtained to the ad server 51, which can proceed to determine the online advertisement to be presented at the communication apparatus 12 based on the profile information 24 received from the server $30_n$.

Although in the above-described examples an advertising content element forming an online advertisement to be presented at the communication apparatus 12 is determined based on the service point location of the communication apparatus 12, it will be appreciated that a primary content element of the network site implemented by the server $30_n$ to be presented at the communication apparatus 12 may be determined by the server $30_n$ (and/or the network component 49) using principles described herein. For example: where the network site provides an online map and/or directions feature, a primary content element conveying a current or starting point in the online map and/or directions feature may be presented at the communication apparatus 12 by the server $30_n$ (or the network component 49) based on the service point location of the communication apparatus 12; where the network site provides a traffic update feature, a primary content element conveying a traffic level may be presented at the communication apparatus 12 by the server $30_n$ (or the network component 49) based on the service point location of the communication apparatus 12; where the network site is a search engine site, a primary content element conveying search results may be presented at the communication apparatus 12 by the server $30_n$ (or the network component 49) in response to a query made by the user 10, based on the service point location of the communication apparatus 12; etc. These examples are presented for illustrative purposes only as various other primary content elements of the network site implemented by the server $30_n$ that are to be presented at the communication apparatus 12 may be determined by the server $30_n$ (and/or the network component 49) using principles described herein.

In addition, while embodiments considered above relate to determining an online content element to be presented at the communication apparatus 12 based on location information regarding the communication apparatus 12, it is to be understood that, in other embodiments, one or more online content elements to be presented at the communication apparatus 12 may be determined by the server $30_n$, the ad server 51 and/or the network component 49 based on one or more other elements of the profile information 24 stored on the communication apparatus 12. For example, in some embodiments, an advertising content element forming an online advertisement to be presented at the communication apparatus 12 may be determined based on personal information (e.g., a name, gender, age, nationality, and/or correspondence language) included in the profile information 24 stored on the communication apparatus 12. This may result in the online advertisement presented to the user 10 being targeted in a personal manner and, thus, having a greater effectiveness. As another example, in some embodiments, an online content element to be presented at the communication apparatus 12 may be determined based on bandwidth information included in the profile information 24 stored on the communication apparatus 12 (e.g., present an online video if a bandwidth available to the communication apparatus 12 permits it or otherwise present another online content element, such as text or a picture, requiring less bandwidth). This may result in the online content presented to the user 10 being customized or otherwise tailored based on capacities of the communication apparatus 12, thereby enhancing the user's experience.

Also, although embodiments considered above relate to presenting at the communication apparatus 12 an online content element that may constitute a portion of an online page, it is to be understood that, in some embodiments, the profile information 24 stored on the communication apparatus 12 may be used to present at the communication apparatus 12 an online content element that constitutes an entirety of an online page.

For example, in one embodiment, the network site implemented by the server $30_n$ may be a generic network site which, upon being accessed by the user 10 of the communication apparatus 12, causes presentation at the communication apparatus 12 of an online page that is determined based on certain information part of the profile information 24 stored on the communication apparatus 12. For instance, in some cases, the certain information may be the service point location of the communication apparatus 12. In some possible examples: the generic network site may be a taxi service site that is identified using a generic domain name (e.g., www.taxi.com) and that, upon being accessed by the communication apparatus 12, causes the communication apparatus 12 to present an online page that is associated with a specific taxi company that serves an area corresponding to the service point location of the communication apparatus 12; the generic network site may be a social networking site (e.g., a blog, a personal information sharing site such as Facebook®, etc.) that is identified using a generic domain name (e.g., www.neighborhoodblog.com) and that, upon being accessed by the communication apparatus 12, causes the communication apparatus 12 to present an online page directed to social networking content specific to an area corresponding to the service point location of the communication apparatus 12; the generic network site may be a site on elected representatives (e.g., members of a parliament or house of representatives) that is identified using a generic domain name (e.g., www.memberofparliament.com) and that, upon being accessed by the communication apparatus 12, causes the communication apparatus 12 to present an online page directed to a specific elected representative who is associated with an area corresponding to the service point location of the communication apparatus 12; etc.

It is to be understood that these examples are presented for illustrative purposes only as various other types of online pages to be presented at the communication apparatus 12 may be determined based on the service point location of the communication apparatus 12.

It is also to be understood that other information that may be part of the profile information 24 stored on the communication apparatus 12 may be used to determine an online page to be presented at the communication apparatus 12 when the generic network site implemented by the server $30_n$ is accessed by the communication apparatus 12. For example, personal information (e.g., a name, gender, age, nationality, and/or correspondence language) included in the profile information 24 stored on the communication apparatus 12 may be used to determine an online page to be presented at the communication apparatus 12 when the generic network site implemented by the server $30_n$ is accessed by the communication apparatus 12. For instance, the generic network site may be an international company's site that, upon being accessed by the communication apparatus 12, causes the communication apparatus 12 to present an online page containing text in a language corresponding to the correspondence language specified in the profile information 24 stored on the communication apparatus 12. As another example, bandwidth information included in the profile information 24 stored on the communication apparatus 12 may be used to determine an online page to be presented at the communication apparatus 12 when the generic network site implemented by the server $30_n$ is accessed by the communication apparatus 12. For instance, the generic network site may, upon being accessed by the communication apparatus 12, cause the communication apparatus 12 to present an online page tailored or otherwise customized on a basis of a bandwidth available to the communication apparatus 12 and specified in the profile information 24 stored thereon.

In some cases, the online page presented at the communication apparatus 12 upon accessing the generic network site implemented by the server $30_n$ may be an online page delivered by the server $30_n$. In other cases, the online page presented at the communication apparatus 12 upon accessing the generic network site implemented by the server $30_n$ may be an online page delivered by another one of the servers $30_1 \ldots 30_N$ to which the communication apparatus 12 has been redirected by the server $30_n$.

While in embodiments previously considered herein certain data is exchanged between various components of the architecture depicted in FIG. 1, it will be appreciated that different data may be exchanged in other embodiments.

Also, while embodiments previously considered herein relate to online content delivered over the public packet-switched network 14, it will be recognized that principles described herein can be applied to online content delivered over a private packet-switched network.

Figure 4:
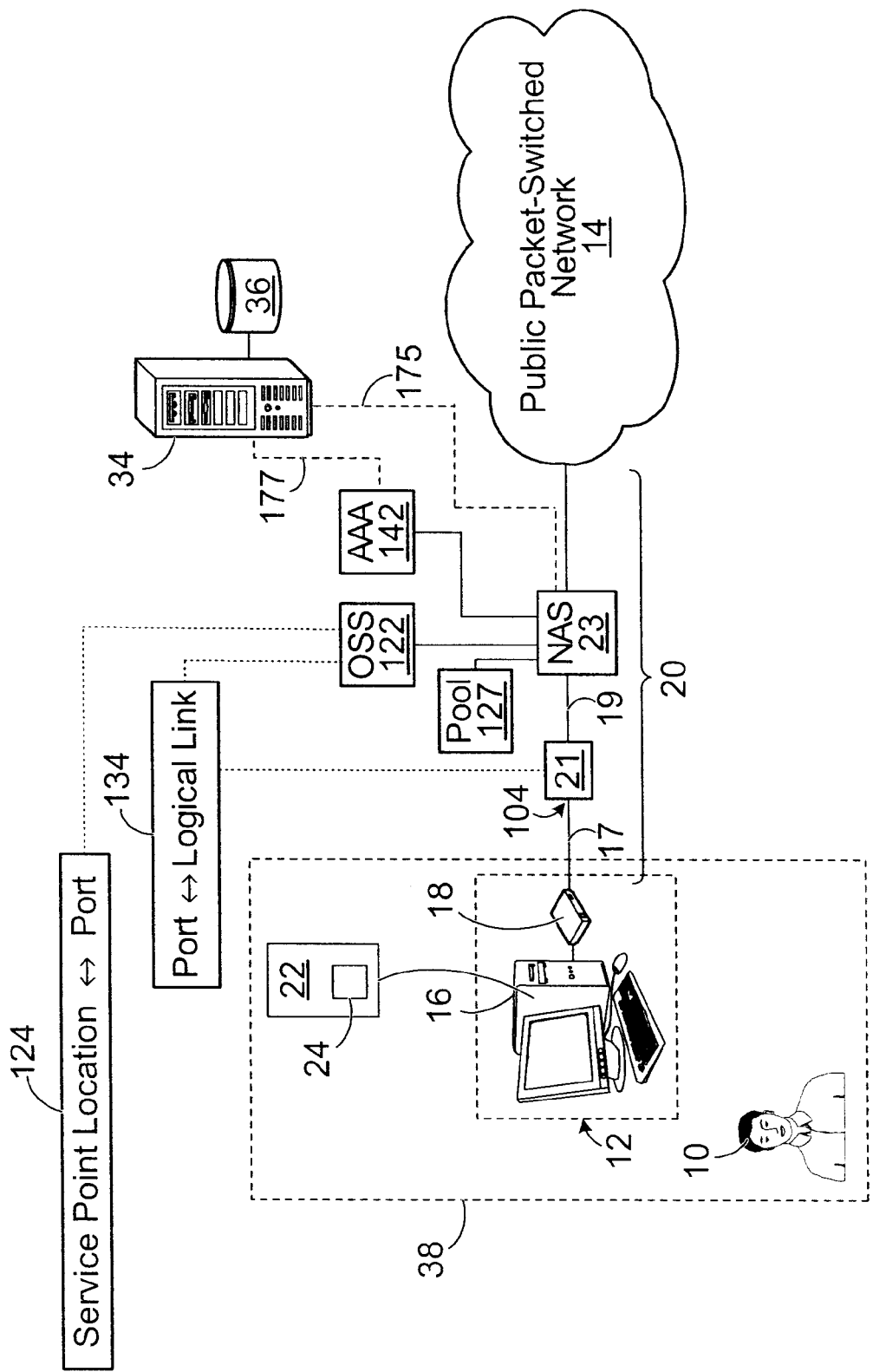
FIGS. 4 to 6 illustrate an example process by which a service provider providing network access to the communication apparatus may cause certain information to be stored on the communication apparatus, in accordance with an embodiment of the present invention.

Turning now to FIG. 4, an example process by which the service provider providing network access to the communication apparatus 12 may cause the profile information 24 to be stored on the communication apparatus 12 will be described. It is recalled that, in this embodiment, the service provider operates the network component 23 that allows the communication apparatus 12 to access the public packet-switched network 14.

The service provider provides a network access service to a given party (who may or may not be the user 10) occupying, owning, managing or otherwise associated with service point 38 where the communication apparatus 12 is located. In order to benefit from the network access service, the given party has a business relationship with the service provider. As part of this business relationship, the given party interacts with the service provider (e.g., during a registration or service activation phase) to provide personal information regarding itself. For example, this personal information may include a name, a gender, a date of birth or an age, a nationality, a correspondence language, a civic address (e.g., a residential or work address), a phone number (e.g., a residential, work, VoIP or mobile phone number), an email address, and/or an IM identifier of the given party. If the given party is more than one person, personal information regarding each such person may be provided. During interaction with the service provider, the given party also indicates a service point location (e.g., a service address) where the network access service is to be delivered, selects a level of service to be obtained, provides billing information (e.g., a billing address and/or credit card information) to pay for the network access service, etc. Interaction between the given party and the service provider may take place via a customer service representative of the service provider or via a web site implemented by the service provider.

Upon interacting with the given party, the service provider maintains in a database 36 a profile associated with the given party. The profile includes information provided by the given party while interacting with the service provider and possibly other information not obtained from the given party but pertaining to the network access service provided to the given party.

In this example, the infrastructure described above in connection with FIG. 1 comprises an operation support system (OSS) 122. The OSS 122 represents a collection of systems that perform management, inventory, engineering, planning, repair and other functions for the service provider. In this light, one of the functions of the OSS 122 may include management of network components, assets and equipment.

Thus, the OSS 122 maintains a mapping 124 between, on the one hand, ports of various access multiplexers or other network components under control of the service provider and, on the other, service point locations of communication apparatuses (such as the communication apparatus 12) connected to those ports. In this case, the mapping 124 maintained by the OSS 122 relates a port 104 of the network component 21 to a service point location, i.e., the location of the service point 38 where the communication apparatus 12 is located. As mentioned previously, this service point location may be expressed as a civic address, a set of geo-coordinates, or any other information identifying where the service point 38 is located.

Also, in this example, the network component 21 of the network portion 20 connecting the communication apparatus 12 to the public packet-switched network 14 is an access multiplexer under control of the service provider. In one embodiment, the access multiplexer 21 may be a DSLAM.

The access multiplexer 21 is connected to the network component 23, which, in this embodiment, is a network access server (NAS) operated by the service provider. The NAS 23, which may also sometimes be referred to as a broadband remote access server (BRAS), a remote access server (RAS) or a broadband access server (BAS), provides access to the public packet-switched network 14. Communication between the access multiplexer 21 and the NAS 23 can take place over the dedicated logical link 19 between these components. The dedicated logical link 19, which may traverse an intervening access data network (not shown), can be implemented in various ways. For example, in one embodiment, the dedicated logical link 19 may be implemented as an asynchronous transfer mode (ATM) permanent virtual circuit (PVC). In another embodiment, the dedicated logical link 19 may be implemented as a virtual local area network (VLAN). It will be appreciated that various other implementations of the dedicated logical link 19 are possible.

The access multiplexer 21 allows data arriving from the NAS 23 along given ATM PVCs, VLANs or other dedicated logical links to be sent over corresponding physical links via corresponding one of its ports, and vice versa. Thus, the access multiplexer 21 can be said to implement a mapping 134 between, on the one hand, dedicated logical links and, on the other, ports of the access multiplexer 21. In this example, the mapping 134 implemented by the access multiplexer 21 relates the dedicated logical link 19 to the port 104 of the access multiplexer 21. In two example embodiments, the mapping 134 can be maintained by either the access multiplexer 21 or the OSS 122.

The infrastructure shown in FIG. 4 further comprises an authorization component 142 connected to the NAS 23. The nature of the connection between the NAS 23 and the authorization component 142 is immaterial. For example, in one embodiment, the authorization component 142 may be a server (e.g., an Authentication, Authorization, and Accounting (AAA) server) responsive to queries from the NAS 23. In such an embodiment, the authorization component 142 and the NAS 23 may communicate using the Remote Authentication Dial In User Service (RADIUS) protocol, a description of which is available at www.ietf.org/rfc/rfc2865.txt. In another embodiment, the authorization component 142 may be a functional component integrated with the NAS 23.

In this example, the NAS 23 is operative to maintain a pool 127 of logical identifiers that can be used by various communication apparatuses, including the communication apparatus 12. In some embodiments, the pool 127 of logical identifiers may be built up as a cooperative effort between the NAS 23 and the OSS 122, while in other embodiments, it may not be necessary for the OSS 122 to be involved in creating the pool 127 of logical identifiers. In still other embodiments, the pool 127 of logical identifiers may be maintained by the authorization component 142, and may be made accessible to the authorization component 142 without needing to pass through the NAS 23.

The infrastructure shown in FIG. 4 also comprises a server 34 that has access to the aforementioned database 36. For example, in one embodiment, the server 34 may be connected to the NAS 23 by a link 175. In another embodiment, the server 34 may be connected to the authorization component 142 by a link 177. The nature of the connection between the server 34 and either the NAS 23 or the authorization component 142 is immaterial. In other embodiments, the server 34 may be part of either the OSS 122, the NAS 23, or the authorization component 142.

It will be appreciated that numerous modifications and variations of the infrastructure of FIG. 4 are possible. For example, in some embodiments, the access multiplexer 21 can be omitted. This may be true in embodiments where the communication apparatus 12 implements a wireless access point. For instance, in such embodiments, the connection between the wireless access point and the NAS 23 may be provided by a dedicated point-to-point link. As another example, in some embodiments, instead of the dedicated logical link 19, there may be a shared link leading to the communication apparatus 12.

Figure 5:
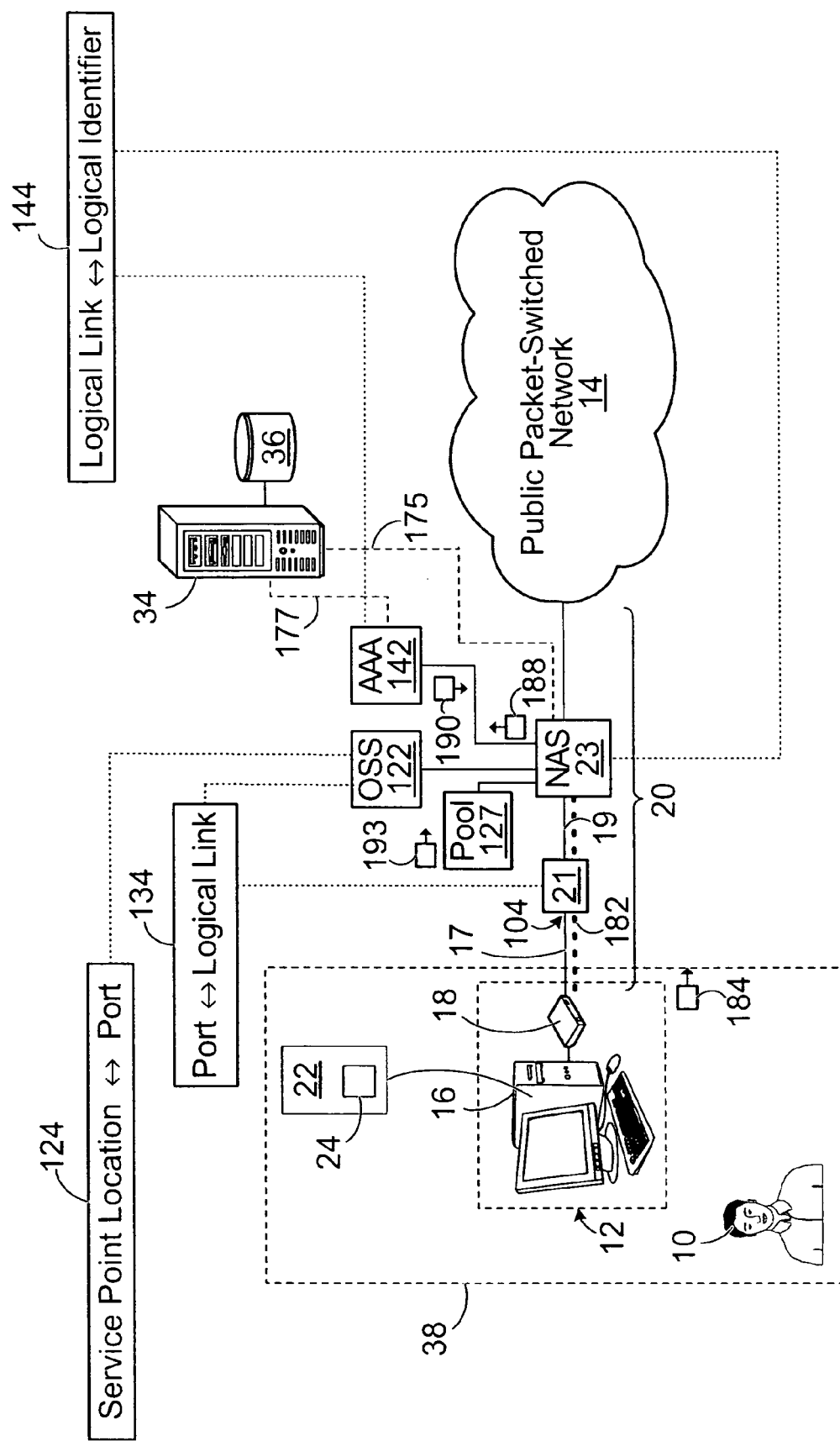

Reference is now made to FIG. 5, which illustrates an example of a possible event flow upon activation of the communication apparatus 12, which may occur, for instance, as the network interface unit 18 and/or the computing device 16 of the communication apparatus 12 is/are powered up. Thereafter:

The communication apparatus 12 establishes physical layer connectivity with the access multiplexer 21 over the physical link 17.

This is followed by establishment of Ethernet connectivity between the communication apparatus 12 and the access multiplexer 21.

The communication apparatus 12 verifies its ability to communicate using Point-to-Point Protocol over Ethernet (PPPoE). For a more detailed explanation of PPPoE, one may refer to Internet Request For Comments (RFC) 2516, available from the Internet Engineering Task Force (http://www.ietf.org), hereby incorporated by reference herein.

Next, assuming that the communication apparatus 12 has the ability to communicate using PPPoE, the communication apparatus 12 verifies whether it should make a so-called "access request" automatically or in response to user input (which can be obtained via a software application). For purposes of this example, let it be assumed that conditions have been met such that the communication apparatus 12 should make an access request.

The communication apparatus 12 begins entry into PPPoE communication by broadcasting an "initiation" packet over the dedicated logical link 19.

The NAS 23 responds to receipt of the initiation packet by sending an "offer" packet to the communication apparatus 12. Thus, at this stage, it can be said that a logical connection 182 has been defined between a first endpoint (the communication apparatus 12) and a second endpoint (the NAS 23).

Following receipt of the offer packet, the communication apparatus 12 sends an access request 184 to the NAS 23 with the ultimate goal of accessing the public packet-switched network 14. The access request 184 may comprise credentials that can be hard coded or programmably installed on the communication apparatus 12. Alternatively, the credentials may be entered by the user 10 of the communication apparatus 12.

Upon receipt of the access request 184 containing the credentials along the dedicated logical link 19, the NAS 23 executes an authorization procedure as follows. The NAS 23 communicates the credentials to the authorization component 142, e.g., via a RADIUS Access-Request message 188. In response to receipt of the credentials from the NAS 23, the authorization component 142 determines whether the credentials allow access to the public packet-switched network 14. For example, this can be determined by consulting a database (not shown). If the credentials allow access to the public packet-switched network 14, the authorization component 142 returns an acceptance message (e.g., a RADIUS Access-Accept message). On the other hand, if the credentials do not allow access to the public packet-switched network 14, the authorization component 142 returns a refusal message (e.g., a RADIUS Access-Reject message). For purposes of this example, assume that the credentials allow access to the public packet-switched network 14, resulting in issuance of an acceptance message 190. In this example, two alternatives are possible:

Alternative 1 (where the pool 127 of logical identifiers is maintained by the authorization component 142): the authorization component 142 obtains a logical identifier 193 from the pool 127 of logical identifiers that is maintained by the authorization component 142. The logical identifier 193 is sent to the NAS 23, which assigns the logical identifier 193 to the dedicated logical link 19.

Alternative 2 (where the pool 127 of logical identifiers is maintained by the NAS 23): responsive to receipt of the acceptance message 190 from the authorization component 142, the NAS 23 obtains a logical identifier 193 from the pool 127 of logical identifiers that is maintained by the NAS 23. The logical identifier 193 so obtained is assigned by the NAS 23 to the dedicated logical link 19.

The NAS 23 sends a "confirmation" packet back to the communication apparatus 12, thus completing establishment of a PPPoE session between the endpoints of the logical connection 182.

Additional hand-shaking may be performed between the communication apparatus 12 and the NAS 23 in order to establish a Point-to-Point Protocol (PPP) session between the endpoints of the logical connection 182.

Following this, further hand-shaking may be undertaken between the communication apparatus 12 and the NAS 23 in order to establish an Internet Protocol Control Protocol (IPCP) session between the endpoints of the logical connection 182.

During the IPCP session, the NAS 23 releases the logical identifier 193 towards the communication apparatus 12 that issued the access request 184, in order to allow the communication apparatus 12 to identify itself using the logical identifier 193 in future communications over the dedicated logical link 19. Since the dedicated logical link 19 to which has been assigned the logical identifier 193 leads to the communication apparatus 12 and since the communication apparatus 12 will identify itself using the logical identifier 193 in future communications, it can be seen that the logical identifier 193 is in essence assigned to the communication apparatus 12.

It is recalled that once the logical identifier 193 has been obtained from the pool 127 of logical identifiers (either by the NAS 23 or by the authorization component 142), the NAS 23 assigns the logical identifier 193 to the dedicated logical link 19.

In an embodiment where the server 34 is connected to the NAS 23 by the link 175, the fact that the NAS 23 assigns the logical identifier 193 to the dedicated logical link 19 allows the NAS 23 to construct and maintain a mapping 144 between, on the one hand, various dedicated logical links (such as the dedicated logical link 19 and others) and, on the other, logical identifiers corresponding to those dedicated logical links.

In an embodiment where the server 34 is connected to the authorization component 142 by the link 177, the logical identifier 193 and the identity of the dedicated logical link 193 to which it is assigned are sent back by the NAS 23 to the authorization component 142, and it is the authorization component 142 that maintains the aforementioned mapping 144 between dedicated logical links and logical identifiers corresponding to those dedicated logical links.

Of course, those skilled in the art will be able to think of other ways of causing the communication apparatus 12 to send the access request 184 over the logical connection 182 between the communication apparatus 12 and the NAS 23, as well as other ways of assigning a logical identifier to the dedicated logical link 19 and thus to the communication apparatus 12. It should further be mentioned that, in some cases, the establishment of the aforementioned PPPoE, PPP and/or IPCP sessions may not be required. This is particularly the case where the dedicated logical link 19 is a VLAN.

In view of the preceding description, and in particular given the previously described mappings 124, 134 maintained in the OSS 122 and/or the access multiplexer 21 and the mapping 144 maintained in the NAS 23 or the authorization component 142, the following describes how one can create an association between logical identifiers and service point locations.

Figure 6:
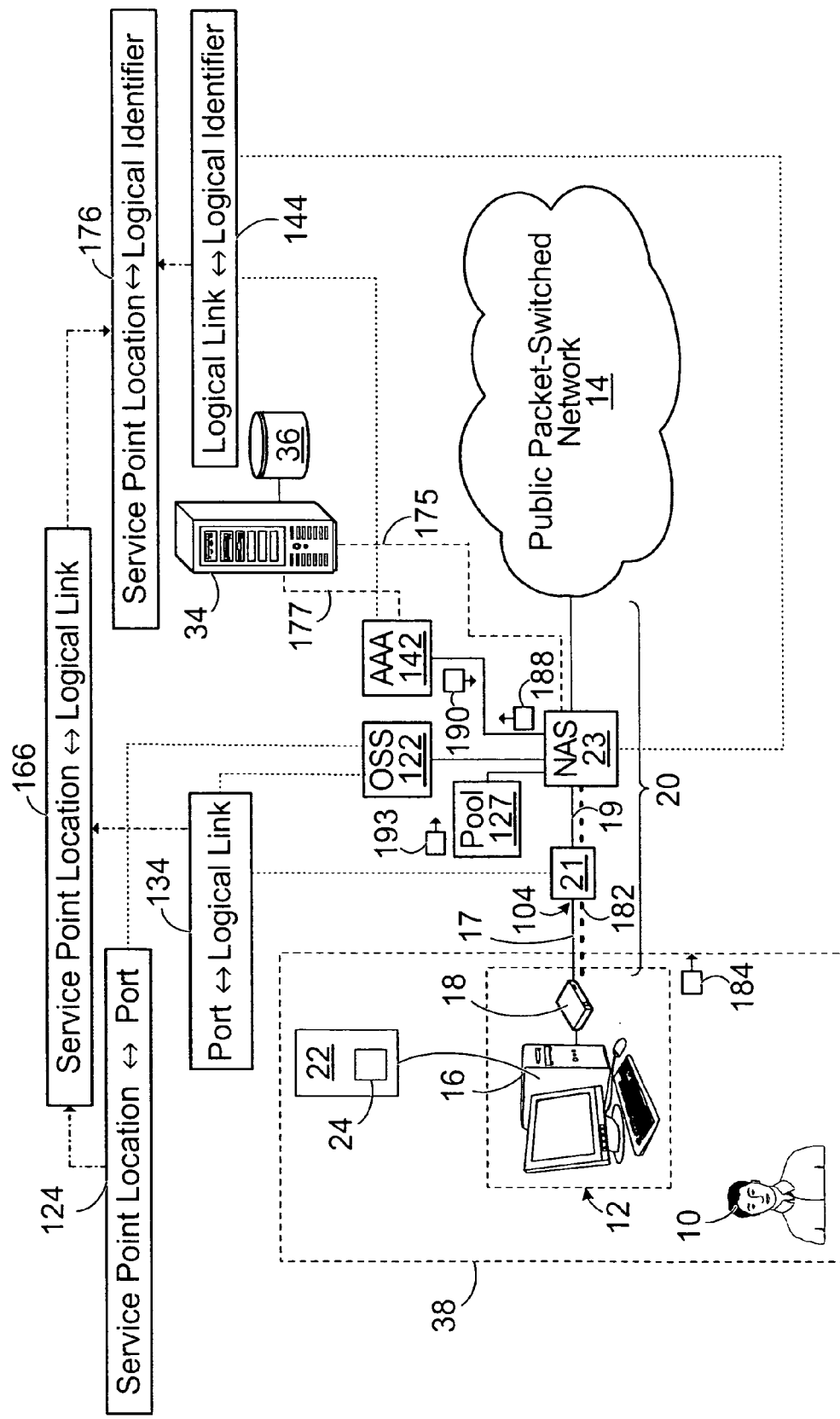

Specifically, with reference to FIG. 6, by combining the mapping 124 with the mapping 134, the OSS 122 can create an intermediate mapping 166 between, on the one hand, dedicated logical links and, on the other hand, service point locations of communication apparatuses having logical connections with the NAS 23 which traverse those dedicated logical links. In this example, the intermediate mapping 166 would associate the dedicated logical link 19 to the service point location of the communication apparatus 12. In one embodiment, the OSS 122 transmits the intermediate mapping 166 to the server 34.

Next, the server 34 may be operative to combine the intermediate mapping 166 (received from the OSS 122) with the aforementioned mapping 144 (received from the NAS 23 or the authorization component 142), thus creating a final mapping 176 between, on the one hand, logical identifiers and, on the other, service point locations of communication apparatuses having logical connections with the NAS 23 which traverse respective dedicated logical links to which those logical identifiers have been assigned. In this example, the final mapping 176 would specify that the logical identifier 193 corresponds to the service point location of the communication apparatus 12, i.e., the location of the service point 38 where the communication apparatus 12 is located.

It is recalled that the profile associated with the given party and stored in the database 36 by the service provider includes the service point location where the network access service is to be delivered to the given party. Thus, based on the final mapping 176 specifying that the logical identifier 193 corresponds to the service point location of the communication apparatus 12, the server 34 associates, in the database 36, the profile associated with the given party to the logical identifier 193 assigned to the communication apparatus 12.

The service provider may then cause the profile information 24 to be stored in the memory 22 of the communication apparatus 12. For example, in this embodiment, the NAS 23 may interact with the server 34 to obtain the profile information 24 from the database 36. More particularly, in this case, the profile information 24 may be obtained from the profile in the database 36 that is associated with the logical identifier 193 assigned to the communication apparatus 12. Upon obtaining the profile information 24, the NAS 23 may send the profile information 24 to the communication apparatus 12 via the network portion 20. The communication apparatus 12 may then proceed to store the profile information 24 in the memory 22.

While this example illustrates one possible way by which the service provider may cause storage of the profile information 24 on the communication apparatus 12, it will be appreciated that the service provider may cause the profile information 24 to be stored on the communication apparatus 12 in various other ways in other embodiments.

Also, in some embodiments, the profile information 24 caused to be stored on the communication apparatus 12 by the service provider may be encrypted. For example, the NAS 23 (or another network component operated by the service provider) may encrypt the profile information 24 before it is sent to the communication apparatus 12 via the network portion 20. In these embodiments, upon obtaining from the communication apparatus 12 the encrypted profile information 24, the server $30_n$, the ad server 51 and/or the network component 49 may proceed to decrypt the profile information 24. For instance, the server $30_n$, the ad server 51 and/or the network component 49 may proceed to decrypt the profile information 24 using a decryption key that is obtained from the NAS 23 or another network component operated by the service provider (possibly in return for payment to the service provider). In some cases, the NAS 23 or the other network component operated by the service provider may provide the decryption key to the server $30_n$, the ad server 51 and/or the network component 49 in response to a request received therefrom. In other cases, the NAS 23 or the other network component operated by the service provider may have previously provided the decryption key to the server $30_n$, the ad server 51 and/or the network component 49 as a result of a trust relationship established between the service provider and the entity operating the server $30_n$, the ad server 51 and/or the network component 49. By virtue of such an encryption/decryption scheme, the service provider can effectively control use of the profile information 24 that it caused to be stored on the communication apparatus 12 by network components such as the server $30_n$, the ad server 51 and/or the network component 49.

It will also be appreciated that other techniques may be employed in other embodiments to associate profiles to logical identifiers in the database 36. For example, in some embodiments, the aforementioned credentials, which may be hard coded or programmably installed on the communication apparatus 12 or entered by the user 10 of the communication apparatus and which may be included in the access request 184 sent by the communication apparatus 12 to the NAS 23, can be used to associate the logical identifier 193 assigned to the communication apparatus 12 to the profile associated with the given party and stored in the database 36. Specifically, these credentials, which are known by the service provider to have been provided to the given party, may be linked by the service provider to the profile associated with the given party. Upon receiving the credentials as part of the access request 184 and assigning the logical identifier 193 to the communication apparatus 12, the service provider may associate, in the database 36, the profile associated with the given party to the logical identifier 193 assigned to the communication apparatus 12.

It will further be appreciated that, in embodiments where the logical identifier is dynamically assigned to the communication apparatus 12 (e.g., a dynamic IP address), the database 36 may be updated accordingly.

Although in embodiments described above the communication apparatus 12 is directly connected to the network portion 20, it will be appreciated that, in some embodiments, the communication apparatus 12 may be connected to a router that is connected to the network portion 20 and that may be connected to one or more other communication apparatuses at the service point 38 where the communication apparatus 12 is located. In such embodiments, the router may perform network address translation (NAT) for packets passing therethrough. Depending on the type of NAT performed, in some cases, the logical identifier assigned to the communication apparatus 12 may include a portion identifying the router and a portion identifying the communication apparatus 12 connected thereto. For instance, the logical identifier assigned to the communication apparatus 12 may include an IP address assigned to the router, as well as a port number of a port of the router to which is connected the communication apparatus 12 or a local IP address assigned to the communication apparatus 12 by the router.

Also, while in embodiments considered above the profile information 24 stored on the communication apparatus 12 may be obtained by the server $30_n$, the ad server 51 and/or the network component 49 without the user 10 being explicitly informed of this fact, in other embodiments there may be mechanisms to notify the user 10 of this fact or confirm with the user 10 that he/she allows this information to be used by the server 30$_n$, the ad server 51 and/or the network component 49. For example, in some embodiments, an applet, widget or other suitable element may be implemented to notify the user 10 via the computing device 16 (e.g., via a pop-up window) that the profile information 24 stored on the communication apparatus 12 is about to be sent to the server 30$_n$, the ad server 51 and/or the network component 49, and possibly to allow the user 10 to confirm whether this profile information (or which part thereof) can be sent to the server 30$_n$, the ad server 51 and/or the network component 49. As another example, the given party (who may or may not be the user 10) occupying, owning, managing or otherwise associated with the service point 38 where the communication apparatus 12 is located may have previously authorized the service provider providing the network access service to the communication apparatus 12 (e.g., during a registration phase) to store the profile information 24 on the communication apparatus 12 in order to facilitate determination of one or more online content elements to be presented at the communication apparatus 12 when the communication apparatus 12 is used to access or interact with network sites implemented by the servers 30$_1$ . . . 30$_N$.

In addition, while in embodiments considered above the profile information 24 stored on the communication apparatus 12 is used in determining online content elements to be presented at the communication apparatus 12 when the user 10 uses the browser implemented by the computing device 16 to access and interact with network sites implemented by the servers 30$_1$ . . . 30$_N$, principles discussed herein can be applied to determine online content elements to be presented at the communication apparatus 12 when the user 10 uses other software applications that are implemented by the computing device 16 and that exchange data over the packet-switched network 14 (e.g., an IM client or a VoIP client having a window presenting online advertisements to the user 10).

Those skilled in the art will appreciate that, in some embodiments, certain functionality of a given component described herein (e.g., the profile information server 34, the server 30$_n$, the ad server 51 and/or the network component 49) may be implemented as pre-programmed hardware or firmware elements (e.g., application specific integrated circuits (ASICs), electrically erasable programmable read-only memories (EEPROMs), etc.) or other related elements. In other embodiments, a given component described herein (e.g., the profile information server 34, the server 30$_n$, the ad server 51 and/or the network component 49) may comprise a processor having access to a code memory which stores program code (e.g., instructions) for operation of the processor to implement functionality of that given component. The program code may be stored on a medium which is fixed, tangible, and readable directly by the given component (e.g., removable diskette, CD-ROM, ROM, fixed disk, USB key, etc.). Alternatively, the program code may be stored remotely but transmittable to the given component via a modem or other interface device connected to a network over a transmission medium. The transmission medium may be either a tangible medium (e.g., optical or analog communications lines) or a medium implemented using wireless techniques (e.g., RF, microwave, infrared or other wireless transmission schemes).

Although various embodiments of the present invention have been described and illustrated, it will be apparent to those skilled in the art that numerous modifications and variations can be made without departing from the scope of the invention, which is defined in the appended claims.

The invention claimed is:

1. A method for presenting online content at a communication apparatus, said method comprising, in order:
   at a service provider providing network access to the communication apparatus:
      obtaining profile information from a profile database maintained by the service provider providing network access to the communication apparatus;
      transmitting the profile information to the communication apparatus;
   at the communication apparatus:
      storing the profile information on the communication apparatus as a cookie;
      communicating the profile information contained in the cookie to an ad server;
   at the ad server:
      receiving the profile information communicated by the communication apparatus;
      determining an online content element to be presented at the communication apparatus based on the received profile information; and
   causing the communication apparatus to present the online content element.

2. A method as claimed in claim 1, wherein said receiving comprises:
   sending first data to the communication apparatus, the first data requesting the profile information; and
   receiving second data communicated by the communication apparatus, the second data conveying the profile information.

3. A method as claimed in claim 1, wherein said receiving comprises receiving the profile information communicated by the communication apparatus without having sent data requesting the profile information to the communication apparatus.

4. A method as claimed in claim 1, wherein the online content element is an advertising content element forming an online advertisement.

5. A method as claimed in claim 1, wherein the online content element is a primary content element of a network site.

6. A method as claimed in claim 1, wherein the online content element is an online page.

7. A method as claimed in claim 1, wherein the profile information includes location information regarding the communication apparatus.

8. A method as claimed in claim 7, wherein the location information includes a service point location of the communication apparatus.

9. A method as claimed in claim 7, wherein the location information includes a location object formatted as a Presence Information Data Format Location Object (PIDF-LO) or equivalent.

10. A method as claimed in claim 7, wherein the location information specifies a set of geo-coordinates.

11. A method as claimed in claim 1, wherein the profile information includes personal information regarding a party.

12. A method as claimed in claim 11, wherein the personal information comprises at least one of: a name, a gender, a date of birth or an age, a nationality, a correspondence language, a civic address, a phone number, an email address, an instant messaging identifier, and financial information.

13. A method as claimed in claim 1, wherein the profile information includes bandwidth information regarding a bandwidth available to the communication apparatus.

14. A method as claimed in claim 13, wherein said determining comprises determining a size of the online content element to be presented based on the bandwidth information.

15. A method as claimed in claim 1, wherein said receiving comprises:
   receiving encrypted data from the communication apparatus; and
   decrypting the encrypted data using a key provided by the service provider to obtain the profile information.

16. An ad server for causing presentation of online content at a communication apparatus, said ad server comprising:
   an interface for receiving and sending data; and
   a processing unit coupled to said interface, the processing unit comprising a processor coupled to a memory and operative for:
      receiving profile information communicated by the communication apparatus, the profile information having been previously transmitted to the communication apparatus from a network component of a service provider providing network access to the communication apparatus, the profile information having been obtained from a profile database maintained by the service provider;
      causing the communication apparatus to present an online content element determined based on the information.

17. An ad server as claimed in claim 16, wherein said receiving comprises:
   sending first data to the communication apparatus, the first data requesting the profile information; and
   receiving second data communicated by the communication apparatus, the second data conveying the profile information.

18. An ad server as claimed in claim 16, wherein said receiving comprises receiving the profile information communicated by the communication apparatus without having sent data requesting the profile information to the communication apparatus.

19. An ad server as claimed in claim 16, wherein the online content element is an advertising content element forming an online advertisement.

20. An ad server as claimed in claim 16, wherein the online content element is a primary content element of a network site.

21. An ad server as claimed in claim 16, wherein the online content element is an online page.

22. An ad server as claimed in claim 16, wherein the profile information includes location information regarding the communication apparatus.

23. An ad server as claimed in claim 22, wherein the location information includes a service point location of the communication apparatus.

24. An ad server as claimed in claim 22, wherein the location information includes a location object formatted as a PIDF-LO or equivalent.

25. An ad server as claimed in claim 22, wherein the location information specifies a set of geo-coordinates.

26. An ad server as claimed in claim 16, wherein the profile information includes personal information regarding a party.

27. An ad server as claimed in claim 26, wherein the personal information comprises at least one of: a name, a gender, a date of birth or an age, a nationality, a correspondence language, a civic address, a phone number, an email address, an instant messaging identifier, and financial information.

28. An ad server as claimed in claim 16, wherein the profile information includes bandwidth information regarding a bandwidth available to the communication apparatus.

29. An ad server as claimed in claim 28, wherein said determining comprises determining a size of the online content element to be presented based on the bandwidth information.

30. An ad server as claimed in claim 16, wherein said processing unit is operative for determining the online content element to be presented at the communication apparatus based on the profile information.

31. An ad server as claimed in claim 16, wherein said receiving comprises:
   receiving encrypted data from the communication apparatus; and
   decrypting the encrypted data using a key provided by the service provider to obtain the profile information.

32. A computer-readable memory storing a program component for execution by a computer system to cause presentation of online content at a communication apparatus, said program component comprising:
   first program code for causing the computer system to receive profile information from the communication apparatus, the profile information having been previously transmitted to the communication apparatus from a network component of a service provider providing network access to the communication apparatus, the profile information having been obtained from a profile database maintained by the service provider;
   second program code for causing the computer system to cause the communication apparatus to present an online content element determined based on the profile information.

33. A method for execution by a communication apparatus connected to a data network, said method comprising, in order:
   receiving profile information transmitted from a network component of a service provider providing network access to the communication apparatus, the profile information having been obtained by the network component from a profile database maintained by the service provider; and
   storing the profile information in a memory of the communication device as a cookie; and
   communicating the profile information contained in the cookie over the data network to allow an ad server to determine an online content element to be presented at the communication apparatus based on the profile information received by the ad server.

34. A method as claimed in claim 33, wherein said communicating is performed in response to receiving over the data network a request to communicate the profile information to the ad server.

35. A method as claimed in claim 33, wherein said communicating is performed without having received a request to communicate the profile information over the data network.

36. A method as claimed in claim 33, wherein said communicating is performed upon determining that a network site accessed by the communication apparatus is a trusted network site.

37. A method as claimed in claim 36, comprising consulting information identifying at least one trusted network site to determine that the network site accessed by the communication apparatus is a trusted network site.

38. A method as claimed in claim 33, wherein the online content element is an advertising content element forming an online advertisement.

39. A method as claimed in claim 33, wherein the online content element is a primary content element of a network site.

40. A method as claimed in claim 33, wherein the online content element is an online page.

41. A method as claimed in claim 33, wherein the profile information includes location information regarding the communication apparatus.

42. A method as claimed in claim 41, wherein the location information includes a service point location of the communication apparatus.

43. A method as claimed in claim 41, wherein the location information includes a location object formatted as a PIDF-LO or equivalent.

44. A method as claimed in claim 33, wherein the profile information includes personal information regarding a party.

45. A method as claimed in claim 44, wherein the personal information comprises at least one of a name, a gender, a date of birth or an age, a nationality, a correspondence language, a civic address, a phone number, an email address, an instant messaging identifier, and financial information.

46. A method as claimed in claim 33, wherein the profile information includes bandwidth information regarding a bandwidth available to the communication apparatus.

47. A communication apparatus for connection to a data network, said communication apparatus comprising:
a network interface unit for receiving profile information transmitted from a network component of a service provider providing network access to the communication apparatus, the profile information having been obtained by the network component from a profile database maintained by the service provider;
a memory storing the profile information as a cookie; and
a processing unit for communicating the profile information over the data network to allow an ad server to determine an online content element to be presented at said communication apparatus based on the profile information.

48. A communication apparatus as claimed in claim 47, wherein said processing unit is adapted for communicating the profile information over the data network in response to receiving over the data network a request to communicate the profile information to the ad server.

49. A communication apparatus as claimed in claim 47, wherein said processing unit is adapted for communicating the profile information over the data network without having received a request to communicate the profile information over the data network.

50. A communication apparatus as claimed in claim 47, wherein said processing unit is adapted for communicating the profile information over the data network upon determining that a network site accessed by said communication apparatus is a trusted network site.

51. A communication apparatus as claimed in claim 50, wherein said processing unit is adapted for consulting information identifying at least one trusted network site to determine that the network site accessed by said communication apparatus is a trusted network site.

52. A communication apparatus as claimed in claim 47, wherein the online content element is an advertising content element forming an online advertisement.

53. A communication apparatus as claimed in claim 47, wherein the online content element is a primary content element of a network site.

54. A communication apparatus as claimed in claim 47, wherein the online content element is an online page.

55. A communication apparatus as claimed in claim 47, wherein the profile information includes location information regarding the communication apparatus.

56. A communication apparatus as claimed in claim 55, wherein the location information includes a service point location of the communication apparatus.

57. A communication apparatus as claimed in claim 55, wherein the location information includes a location object formatted as a PIDF-LO or equivalent.

58. A communication apparatus as claimed in claim 47, wherein the profile information includes personal information regarding a party.

59. A communication apparatus as claimed in claim 58, wherein the personal information comprises at least one of: a name, a gender, a date of birth or an age, a nationality, a correspondence language, a civic address, a phone number, an email address, an instant messaging identifier, and financial information.

60. A communication apparatus as claimed in claim 47, wherein the profile information includes bandwidth information regarding a bandwidth available to said communication apparatus.

61. A computer-readable memory storing a program component which, when executed by a communication apparatus, causes the communication apparatus to carry out a method, said method comprising:
receiving profile information transmitted from a network component of a service provider providing network access to the communication apparatus, the profile information having been obtained by the network component from a profile database maintained by the service provider; and
after said receiving, communicating the profile information over the data network to allow an ad server to determine an online content element to be presented at the communication apparatus based on the profile information.

62. A system for presenting online content at a communication apparatus, comprising:
a service provider network component configured for:
obtaining profile information from a profile database maintained by a service provider providing network access to the communication apparatus;
transmitting the profile information to the communication apparatus;
an ad server for causing presentation of online content at a communication apparatus, the ad server configured for:
receiving the profile information communicated by the communication apparatus, the profile information having been previously transmitted to the communication apparatus by the service provider network component;
determining an online content element to be presented at the communication apparatus based on the profile information; and
causing the communication apparatus to present the online content element.

* * * * *